(12) United States Patent
Agarwal et al.

(10) Patent No.: US 11,310,809 B2
(45) Date of Patent: Apr. 19, 2022

(54) TECHNIQUES FOR USING A PORTION OF A TRANSMISSION TIME INTERVAL TO TRANSMIT A TRANSMISSION THAT IS SHORTER THAN A DURATION OF THE TRANSMISSION TIME INTERVAL

(71) Applicant: QUALCOMM Incorporated, San Diego, CA (US)

(72) Inventors: Ravi Agarwal, San Diego, CA (US); Gavin Bernard Horn, La Jolla, CA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 33 days.

(21) Appl. No.: 15/389,144

(22) Filed: Dec. 22, 2016

(65) Prior Publication Data

US 2017/0325246 A1 Nov. 9, 2017

Related U.S. Application Data

(60) Provisional application No. 62/331,834, filed on May 4, 2016.

(51) Int. Cl.
*H04W 4/00* (2018.01)
*H04W 72/12* (2009.01)
(Continued)

(52) U.S. Cl.
CPC ........... *H04W 72/12* (2013.01); *H04L 5/0051* (2013.01); *H04L 5/0053* (2013.01);
(Continued)

(58) Field of Classification Search
USPC .... 370/229, 230, 230.1, 252, 314, 328, 329, 370/330, 345
See application file for complete search history.

(56) References Cited

U.S. PATENT DOCUMENTS 10,075,949 B2 * 9/2018 Kuchibhotla ......... H04L 5/0007
10,411,869 B2   9/2019 Lee et al.
(Continued)

FOREIGN PATENT DOCUMENTS

EP     3324693 A1    5/2018
WO  2015139795 A1   9/2015
(Continued)

OTHER PUBLICATIONS

ISA/EP, International Search Report and Written Opinion of the International Searching Authority, Int'l Application No. PCT/US2017/030037, dated Jul. 28, 2017, European Patent Office, Rijswijk, NL, 13 pgs.

(Continued)

*Primary Examiner* — Nguyen H Ngo
(74) *Attorney, Agent, or Firm* — Terry Tsai

(57) ABSTRACT

Techniques are described for wireless communication. One method includes determining a portion of a transmission time interval (TTI) is available for a transmission that is shorter than a duration of the TTI; selecting a transmission format for transmitting the transmission to a receiving device during the portion of the TTI; and indicating a timing of the transmission to the receiving device. Another method includes determining a portion of a TTI is available for a transmission that is shorter than a duration of the TTI; selecting a transmission format from a plurality of transmission formats for transmitting the transmission to a receiving device during the portion of the TTI; and transmitting the transmission to the receiving device.

24 Claims, 16 Drawing Sheets

(51) Int. Cl.
*H04L 5/00* (2006.01)
*H04W 72/04* (2009.01)
(52) U.S. Cl.
CPC ....... *H04L 5/0092* (2013.01); *H04W 72/0406* (2013.01); *H04W 72/1215* (2013.01)

(56) References Cited

U.S. PATENT DOCUMENTS

| | | | | |
|---|---|---|---|---|
| 2007/0121741 | A1* | 5/2007 | Tang | H04L 27/2639 375/260 |
| 2011/0134757 | A1* | 6/2011 | Lin | H04W 74/0833 370/241 |
| 2014/0204900 | A1* | 7/2014 | Kawasaki | H04L 5/0005 370/330 |
| 2015/0249564 | A1* | 9/2015 | Kim | H04L 27/36 370/329 |
| 2015/0312958 | A1* | 10/2015 | Cheng | H04L 5/0048 370/252 |
| 2015/0334685 | A1 | 11/2015 | Ji et al. | |
| 2016/0262241 | A1* | 9/2016 | Huang | H05B 47/10 |
| 2016/0270109 | A1* | 9/2016 | Jiang | H04L 5/0055 |
| 2016/0309451 | A1* | 10/2016 | Ye | H04W 72/042 |
| 2017/0135077 | A1* | 5/2017 | Meng | H04L 5/001 |
| 2017/0164213 | A1* | 6/2017 | Lim | H04W 24/02 |
| 2017/0171842 | A1* | 6/2017 | You | H04L 5/0023 |
| 2017/0223702 | A1* | 8/2017 | Yin | H04L 1/1887 |
| 2017/0264401 | A1* | 9/2017 | Soong | H04L 5/005 |
| 2017/0290005 | A1* | 10/2017 | Lin | H04L 47/30 |
| 2017/0290008 | A1* | 10/2017 | Tooher | H04W 72/0446 |
| 2017/0317794 | A1* | 11/2017 | You | H04L 5/005 |
| 2018/0020462 | A1* | 1/2018 | Xiong | H04W 72/1215 |
| 2018/0042013 | A1* | 2/2018 | Byun | H04W 72/0446 |
| 2018/0063736 | A1* | 3/2018 | Sadeghi | H04W 24/10 |
| 2018/0103504 | A1* | 4/2018 | Quan | H04W 52/0216 |
| 2018/0110062 | A1* | 4/2018 | Byun | H04B 7/26 |
| 2018/0115984 | A1* | 4/2018 | Sahlin | H04W 72/1268 |
| 2018/0124829 | A1* | 5/2018 | Lee | H04W 74/085 |
| 2018/0176912 | A1* | 6/2018 | Li | H04W 72/042 |
| 2018/0176938 | A1* | 6/2018 | Shao | H04W 72/0413 |
| 2018/0212732 | A1* | 7/2018 | You | H04L 5/0053 |
| 2018/0242296 | A1* | 8/2018 | Li | H04L 27/26 |
| 2018/0294942 | A1* | 10/2018 | Byun | H04L 5/1469 |
| 2018/0324834 | A1* | 11/2018 | Sebire | H04L 5/14 |
| 2018/0332605 | A1* | 11/2018 | Pelletier | H04W 72/1242 |

FOREIGN PATENT DOCUMENTS

| | | |
|---|---|---|
| WO | 2015179749 A1 | 11/2015 |
| WO | 2016053844 A1 | 4/2016 |
| WO | 2016064049 A1 | 4/2016 |

OTHER PUBLICATIONS

Samsung, "Study on Specification Impact for Downlink due to TTI Shortening," 3GPP TSG RAN WG1 Meeting #83, R1-156819, Anaheim, USA, Nov. 15-22, 2015, 5 pgs., XP051003179, 3rd Generation Partnership Project.

ZTE, "Study on PUSCH Transmission in Shortened TTI" 3GPP TSG RAN WG1 Meeting #84bis, R1-162406, Busan, Korea, Apr. 11-15, 2016, 5 pgs., XP051080179, 3rd Generation Partnership Project.

Nokia Networks et al., "Considerations on Shorter TTI for TDD Duplex Mode", 3GPP TSG-RAN WG1 Meeting #84, 3GPP Draft; R1-160780, Feb. 14, 2016, 5 Pages, XP051054107, Retrieved from the Internet: URL: http://www.3gpp.org/ftp/Meetings_3GPP_SYNC/RAN1/Docs/ [retrieved on Feb. 14, 2016].

European Search Report—EP21182871—Search Authority—The Hague—dated Sep. 14, 2021.

Panasonic: "Indication of PDSCH in Partial Subframe", 3GPP Draft, 3GPP TSG RAN WG1 Meeting #81, R1-152921, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25, 2015-May 29, 2015, May 15, 2015 (May 15, 2015), XP050972280,4 Pages, Retrieved from the Internet: URL: http://www.3gpp.org/ftp/tsg_ran/WG1_RL1/TSGR1_81/Docs/. [Retrieved on May 15, 2015].

* cited by examiner

TECHNIQUES FOR USING A PORTION OF A TRANSMISSION TIME INTERVAL TO TRANSMIT A TRANSMISSION THAT IS SHORTER THAN A DURATION OF THE TRANSMISSION TIME INTERVAL

CROSS REFERENCES

The present Application for Patent claims priority to U.S. Provisional Patent Application No. 62/331,834 by Agarwal, et al., entitled "Techniques For Using A Portion Of A Transmission Time Interval (TTI) To Transmit A Transmission That Is Shorter Than A Duration Of The TTI," filed May 4, 2016, assigned to the assignee hereof, and is expressly incorporated by reference herein.

INTRODUCTION

The present disclosure, for example, relates to wireless communication systems, and more particularly to techniques for using a portion of a TTI to transmit a transmission that is shorter than a duration of the TTI.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UE). In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of smart radio heads (RH) in communication with a number of access node controller (ANC), where a set of one or more RHs, in communication with an ANC, defines an eNB. A base station or RH may communicate with a set of UEs on downlink (DL) channels (e.g., for transmissions from a base station or RH to a UE) and uplink (UL) channels (e.g., for transmissions from a UE to a base station or RH).

In some examples, a wireless communication device (e.g., a UE or network access device (e.g., an eNB, an ANC, a RH, or a base station)) may transmit based on a first radio access technology (RAT) or a second RAT. When transmitting based on one RAT, the wireless communication device may be unable to transmit based on another RAT.

SUMMARY

A method of wireless communication at a wireless communication device is described. The method may include determining a portion of a TTI is available for a transmission that is shorter than a duration of the TTI; selecting a transmission format for transmitting the transmission to a receiving device during the portion of the TTI; and indicating a timing of the transmission to the receiving device.

An apparatus for wireless communication is described. The apparatus may include a processor, memory in electronic communication with the processor. The processor and memory may be configured to determine a portion of a TTI is available for a transmission that is shorter than a duration of the TTI; select a transmission format for transmitting the transmission to a receiving device during the portion of the TTI; and indicate a timing of the transmission to the receiving device.

Another apparatus for wireless communication is described. The apparatus may include means for determining a portion of a TTI is available for a transmission that is shorter than a duration of the TTI; means for selecting a transmission format for transmitting the transmission to a receiving device during the portion of the TTI; and means for indicating a timing of the transmission to the receiving device.

A non-transitory computer readable medium for wireless communication is described. The non-transitory computer-readable medium may include instructions operable to cause a processor to determine a portion of a TTI is available for a transmission that is shorter than a duration of the TTI; select a transmission format for transmitting the transmission to a receiving device during the portion of the TTI; and indicate a timing of the transmission to the receiving device.

Another method of wireless communication at a wireless communication device is described. The method may include determining a portion of a TTI is available for a transmission that is shorter than a duration of the TTI; selecting a transmission format from a plurality of transmission formats for transmitting the transmission to a receiving device during the portion of the TTI; and transmitting the transmission to the receiving device.

Another apparatus for wireless communication is described. The apparatus may include a processor, memory in electronic communication with the processor. The processor and memory may be configured to determine a portion of a TTI is available for a transmission that is shorter than a duration of the TTI; select a transmission format from a plurality of transmission formats for transmitting the transmission to a receiving device during the portion of the TTI; and transmit the transmission to the receiving device.

Another apparatus for wireless communication is described. The apparatus may include means for determining a portion of a TTI is available for a transmission that is shorter than a duration of the TTI; means for selecting a transmission format from a plurality of transmission formats for transmitting the transmission to a receiving device during the portion of the TTI; and means for transmitting the transmission to the receiving device.

A non-transitory computer readable medium for wireless communication is described. The non-transitory computer-readable medium may include instructions operable to cause a processor to determine a portion of a TTI is available for a transmission that is shorter than a duration of the TTI; select a transmission format from a plurality of transmission formats for transmitting the transmission to a receiving device during the portion of the TTI; and transmit the transmission to the receiving device.

Some examples of the method, apparatus, and non-transitory computer-readable medium described above, indicating the timing of the transmission to the receiving device, may further include processes, features, means, or instructions for transmitting a reference signal in a first reference signal location that differs from a second reference signal location of a full-length TTI transmission.

Some examples of the method, apparatus, and non-transitory computer-readable medium described above, indicating the timing of the transmission, may further include processes, features, means, or instructions for transmitting at least one reference signal at a first reference signal density that differs from a second reference signal density associated with a full-length TTI transmission.

Some examples of the method, apparatus, and non-transitory computer-readable medium described above, indicating the timing of the transmission, may further include processes, features, means, or instructions for transmitting a predetermined sequence.

In some examples of the method, apparatus, and non-transitory computer-readable medium described above, the predetermined sequence is transmitted at: a start of the transmission, or an end of the transmission, or a combination thereof. In some examples of the method, apparatus, and non-transitory computer-readable medium described above, the predetermined sequence comprises: a preamble sequence, or a pilot symbol configuration, or a combination thereof.

In some examples of the method, apparatus, and non-transitory computer-readable medium described above, indicating the timing of the transmission comprises indicating: a start time of the transmission, or a stop time of the transmission, or a duration of the transmission, or a combination thereof. In some examples of the method, apparatus, and non-transitory computer-readable medium described above, the timing of the transmission is indicated to the receiving device as part of the transmission.

In some examples of the method, apparatus, and non-transitory computer-readable medium described above, the transmission format comprises a shortened TTI transmission format, and the transmission comprises a shortened TTI. In some examples of the method, apparatus, and non-transitory computer-readable medium described above, the transmission format comprises: a puncturing of at least one symbol of the TTI, or a non-transmission of at least one symbol of the TTI, or a combination thereof. In some examples of the method, apparatus, and non-transitory computer-readable medium described above, the transmission format differs from: a full-length TTI transmission format, or at least one other transmission format for at least one other transmission that is shorter than the duration of the TTI, or a combination thereof.

Some examples of the method, apparatus, and non-transitory computer-readable medium described above may further include processes, features, means, or instructions for receiving a plurality of transmission formats from a network access device. In some examples of the method, apparatus, and non-transitory computer-readable medium described above, the transmission format is selected from the plurality of transmission formats.

In some examples of the method, apparatus, and non-transitory computer-readable medium described above, the portion of the TTI is determined based at least in part on a transmission switching event occurring during the TTI.

Some examples of the method, apparatus, and non-transitory computer-readable medium described above may further include processes, features, means, or instructions for identifying the transmission switching event as occurring during the TTI; and identifying an unavailable portion of the TTI, the unavailable portion of the TTI having a second duration based at least in part on a switching duration of the transmission switching event. In some examples of the method, apparatus, and non-transitory computer-readable medium described above, the portion of the TTI available for the transmission is determined based at least in part on the unavailable portion of the TTI.

In some examples of the method, apparatus, and non-transitory computer-readable medium described above, the transmission switching event comprises: switching from a first transmission according to a first RAT to a second transmission according to a second RAT, or switching from the second transmission according to the second RAT to the first transmission according to the first RAT.

Some examples of the method, apparatus, and non-transitory computer-readable medium described above may further include processes, features, means, or instructions for restricting the wireless communication device from transmitting based at least in part on a timing difference between a first transmission based at least in part on a first RAT and a second transmission based at least in part on a second RAT. In some examples of the method, apparatus, and non-transitory computer-readable medium described above, the portion of the TTI available is determined based at least in part on a timing difference between a first transmission based at least in part on a first RAT and a second transmission based at least in part on a second RAT.

Another method of wireless communication at a wireless communication device is described. The method may include receiving from a transmitting device, during a TTI, a transmission that is shorter than a duration of the TTI; receiving, from the transmitting device, an indication of a timing of the transmission; and identifying the transmission based at least in part on the indication of the timing of the transmission.

Another apparatus for wireless communication is described. The apparatus may include a processor, memory in electronic communication with the processor. The processor and memory may be configured to receive from a transmitting device, during a TTI, a transmission that is shorter than a duration of the TTI; receive, from the transmitting device, an indication of a timing of the transmission; and identify the transmission based at least in part on the indication of the timing of the transmission.

Another apparatus for wireless communication is described. The apparatus may include means for receiving from a transmitting device, during a TTI, a transmission that is shorter than a duration of the TTI; means for receiving, from the transmitting device, an indication of a timing of the transmission; and means for identifying the transmission based at least in part on the indication of the timing of the transmission.

A non-transitory computer readable medium for wireless communication is described. The non-transitory computer-readable medium may include instructions operable to cause a processor to receive from a transmitting device, during a TTI, a transmission that is shorter than a duration of the TTI; receive, from the transmitting device, an indication of a timing of the transmission; and identify the transmission based at least in part on the indication of the timing of the transmission.

In some examples of the method, apparatus, and non-transitory computer-readable medium described above, the indication of the timing of the transmission comprises a reference signal received in a first reference signal location that differs from a second reference signal location of a full-length TTI transmission.

In some examples of the method, apparatus, and non-transitory computer-readable medium described above, the indication of the timing of the transmission comprises at least one reference signal received at a first reference signal density that differs from a second reference signal density associated with a full-length TTI. In some examples of the method, apparatus, and non-transitory computer-readable medium described above, the indication of the timing of the transmission comprises a predetermined sequence. In some examples of the method, apparatus, and non-transitory computer-readable medium described above, the predetermined sequence is received at: a start of the transmission, or an end of the transmission, or a combination thereof.

In some examples of the method, apparatus, and non-transitory computer-readable medium described above, the predetermined sequence comprises: a preamble sequence, or a pilot symbol configuration, or a combination thereof. In some examples of the method, apparatus, and non-transitory computer-readable medium described above, the indication of the timing of the transmission indicates: a start time of the transmission, or a stop time of the transmission, or a duration of the transmission, or a combination thereof.

In some examples of the method, apparatus, and non-transitory computer-readable medium described above, the indication of the timing of the transmission is received as part of the transmission. In some examples of the method, apparatus, and non-transitory computer-readable medium described above, the transmission comprises a shortened TTI.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The present disclosure describes techniques for decreasing a number of TTIs that are wasted (e.g., not used) when switching or tuning between transmissions based on a first RAT (e.g., LTE/LTE-A) and transmissions based on a second RAT, or when transmitting or receiving interfering transmissions. In some examples, the techniques may use a portion of a TTI to transmit a transmission that is shorter than a duration of the TTI. For example, a portion of a TTI; e.g., a subframe, slot of a subframe, symbol period of a subframe, or other time period) may be used to transmit a transmission that is shorter than a duration of a TTI. In some examples, the transmission may include a shortened TTI. Because the transmission is shorter than a duration of a TTI, a receiving device may not expect the transmission or know a timing of the transmission. As a result, the timing of the transmission may be indicated to the receiving device. In some examples, the timing may be indicated to the receiving device as part of the transmission. In other examples, the timing may be indicated to the receiving device separately from the transmission. Transmitting transmissions shorter than the duration of a TTI, during TTIs in which full-length TTI transmissions cannot be made, may decrease the number of TTIs that are wasted (e.g., not used) when switching or tuning between transmissions based on a first RAT (e.g., LTE/LTE-A) and transmissions based on a second RAT, or when transmitting or receiving interfering transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations or blocks may be added, omitted, or combined. Also, features described with respect to some examples may be combined in some other examples.

Figure 1:
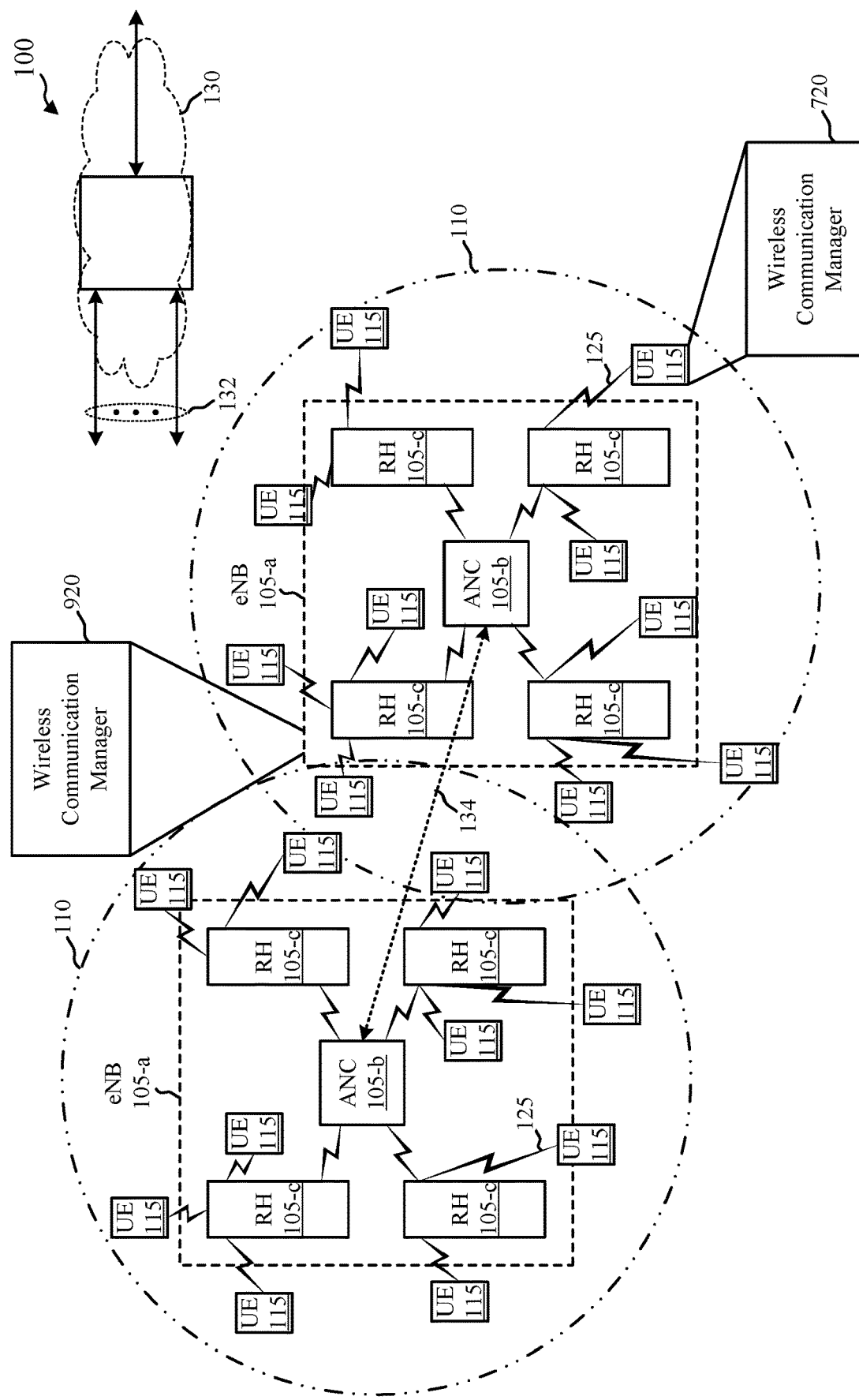
FIG. 1 shows an example of a wireless communication system, in accordance with one or more aspects of the present disclosure.

FIG. 1 shows an example of a wireless communication system 100, in accordance with one or more aspects of the present disclosure. The wireless communication system 100 may include network access devices 105, UEs 115, and a core network 130. The core network 130 may provide user authentication, access authorization, tracking, Internet Protocol (IP) connectivity, and other access, routing, or mobility functions. At least some of the network access devices 105 (e.g., eNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart RHs 105-c. In an alternative configuration of the wireless communication system 100, the functionality of an ANC 105-b may be provided by a RH 105-c or distributed across the RHs 105-c of an eNB 105-a. In another alternative configuration of the wireless communication system 100, the RHs 105-c may be replaced with base stations, and the ANCs 105-b may be replaced by base station controllers (or links to the core network 130). The wireless communication system 100 may also include a mix of RHs 105-c, base stations, and/or other network access devices 105 for receiving/transmitting communications according to different RATs (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered RH or base station, as compared with a macro cell, and may operate in the same or different frequency spectrum band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-a and/or RHs 105-c may have similar frame timing, and transmissions from different eNBs 105-a and/or RHs 105-c may be approximately aligned in time. For asynchronous operation, the eNBs 105-a and/or RHs 105-c may have different frame timings, and transmissions from different eNBs 105-a and/or RHs 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a RH 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may, additionally or alternatively, include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Additionally or alternatively, a UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, or the like. A UE 115 may be able to communicate with various types of eNBs 105-a, RHs 105-c, base stations, access points, or other network access devices, including macro eNBs, small cell eNBs, relay base stations, and the like. A UE 115 may, additionally or alternatively, be able to communicate directly with other UEs 115 (e.g., using a peer-to-peer (P2P) protocol).

The communication links 125 shown in wireless communication system 100 may include ULs from a UE 115 to a RH 105-c, and/or DLs, from a RH 105-c to a UE 115. The DLs may also be called forward links, while the ULs may also be called reverse links. Control information and data may be multiplexed on an UL or DL according to one or more techniques. Control information and data may be multiplexed on an UL or DL, for example, using Time-Division Multiplexing (TDM) techniques, Frequency-Division Multiplexing (FDM) techniques, or hybrid TDM-FDM techniques.

One or more of the UEs 115 may include a wireless communication manager 720. In some examples, the wireless communication manager 720 may be an example of the wireless communication manager 720 described with reference to FIG. 7, 8, or 11, and may be used to determine a portion of a TTI is available for a transmission that is shorter than a duration of the TTI; select a transmission format (e.g., a format associated with a duration, other timing information, reference symbol location(s), etc.) for transmitting the transmission to a receiving device during the portion of the TTI; and indicate a timing of the transmission to the receiving device.

One or more of the network access devices 105 (e.g., one or more eNBs 105-a) may include a wireless communication manager 920. In some examples, the wireless communication manager 920 may be an example of the wireless communication manager 920 described with reference to FIG. 9, 10, or 12, and may be used to receive from a transmitting device, during a TTI, a transmission that is shorter than a duration of the TTI; receive, from the transmitting device, an indication of a timing of the transmission; and identify the transmission based at least in part on the indication of the timing of the transmission.

Each of the communication links 125 may include one or more carriers, where each carrier may be a signal made up of multiple sub-carriers (e.g., waveform signals of different frequencies) modulated according to one or more RATs. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 100, the RHs 105-c and/or UEs 115 may include multiple antennas for employing antenna diversity schemes to improve communication quality and reliability between RHs 105-c and UEs 115. Additionally or alternatively, RHs 105-c and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple DL CCs and one or more UL CCs for CA. CA may be used with both FDD and TDD CC.

Figure 2:
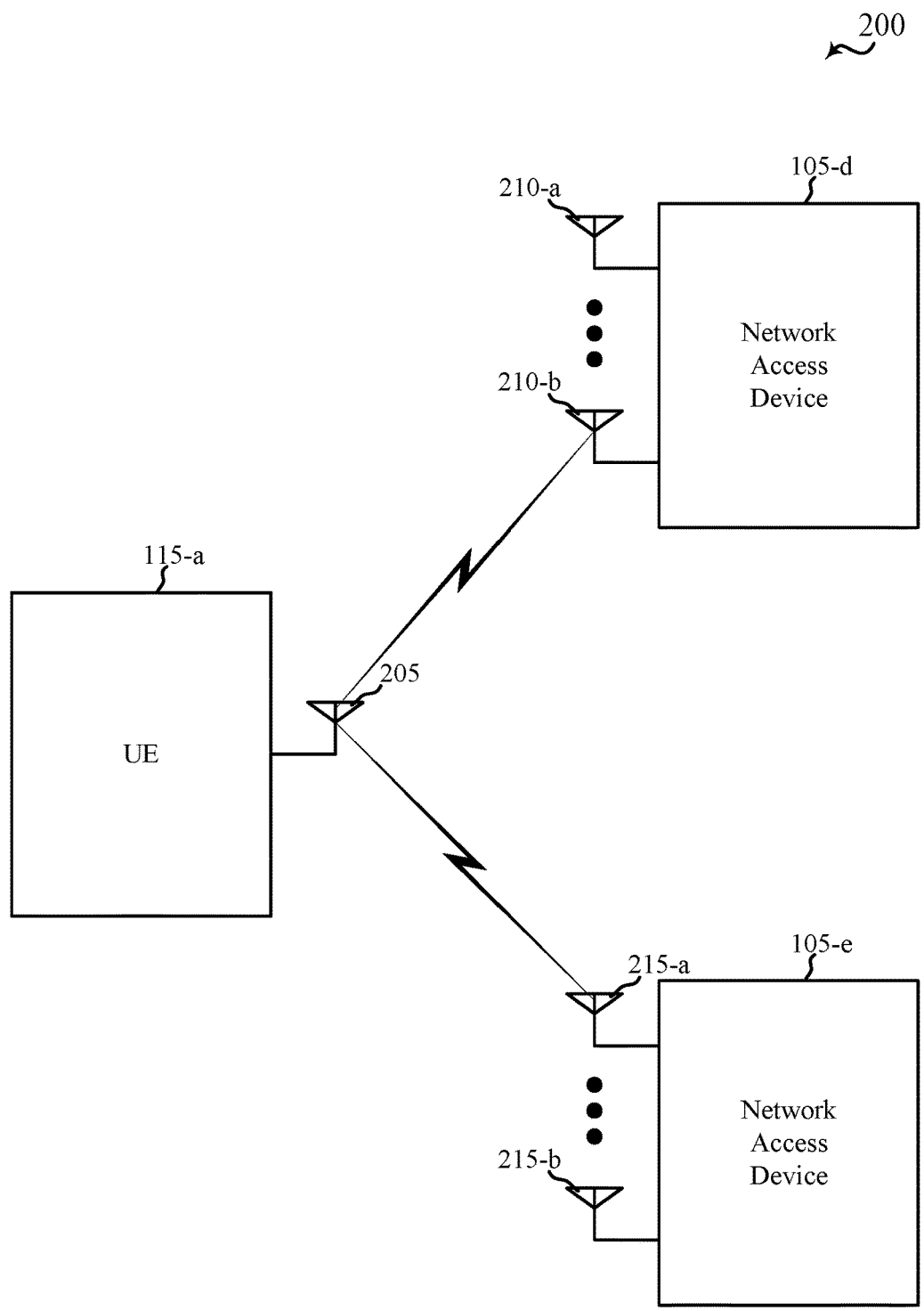
FIG. 2 shows an example of a wireless communication system, in accordance with one or more aspects of the present disclosure.

FIG. 2 shows an example of a wireless communication system 200, in accordance with one or more aspects of the present disclosure. The wireless communication system 200 may include a UE 115-a, a first network access device 105-d, and a second network access device 105-e. The UE 115-a, first network access device 105-d, and second network access device 105-e may be examples of aspects of the UEs 115 and network access devices 105 described with reference to FIG. 1.

Each of the UE 115-a, the first network access device 105-d, and the second network access device 105-e may include a number of antennas (e.g., one or more antennas). By way of example, the UE 115-a is shown to have a single antenna 205, the first network access device 105-d is shown to have at least a first antenna 210-a and a second antenna 210-b, and the second network access device 105-e is shown to have at least a first antenna 215-a and a second antenna 215-b.

In some examples, the UE 115-a may maintain two or more concurrent active connections (e.g., simultaneous connections). The two or more concurrent active connections may be based on the same RAT or different RATs. Same RAT connections may be referred to as intra-RAT connections. Different RAT connections may be referred to as inter-RAT connections. Some example scenarios of two or more concurrent active connections include:

LTE/LTE-A+5G (e.g., a dual-connectivity scenario in which LTE/LTE-A is used as the primary RAT)
LTE/LTE-A VoIP/1x/GSM/WCDMA Voice+5G Data
5G+5G/LTE/LTE-A/WLAN (e.g., a dual-connectivity scenario in which 5G is used as the primary RAT)
Dual-SIM Dual-Active (DSDA)

Providing the UE 115-a with multiple (e.g., dual) radios for concurrent RAT operation can be expensive in terms of cost, power, etc., and can lead to in-device coexistence issues in which transmission/reception using one RAT interferes with transmission/reception using another RAT. Enabling a UE to not transmit or receive on certain occasions, with network cooperation, can sometimes alleviate some of these issues. For example, enabling a UE to not transmit or receive on certain occasions can enable time sharing of a radio between two concurrent active connections (e.g., one connection between the single antenna 205 of the UE 115-a and the second antenna 210-b of the first network access device 105-d, and one connection between the antenna 205 of the UE 115-a and the first antenna 215-a of the second network access device 105-e) and (in some cases) provide cost or power savings. Enabling a UE to not transmit or receive on certain occasions can, additionally or alternatively, mitigate (or resolve) in-device coexistence issues (e.g., interference between transmissions/receptions based on different RATs).

In some examples, the UE 115-a may have multiple receive chains but only a single transmit chain, with the transmit chain being time-shared by different RATs. In some examples, the UE 115-a may have a single transmit chain and single receive chain, with each of the transmit chain and the receive chain being time-shared by different RATs. In some examples, where the UE 115-a is sharing a receive or transmit chain, the UE 115-a may need to transmit or receive during a shorter duration of a TTI associated with a RAT. In some examples, the UE 115-a may transmit or receive during a shorter duration of a TTI associated with a RAT based on a channel being occupied (e.g., in unlicensed spectrum). In some examples, and at a given moment in time, transmissions may be made based on a first RAT or transmissions may be made based on a second RAT (but not both), e.g., due to a sharing of a transmit chain, such that resources are available for just one type of transmission at a time, or due to interference between two or more types of transmissions. In some examples, UE 115-a may be restricted from transmitting based at least in part on a timing difference between the first transmission based at least in part on the first RAT and the second transmission based at least in part on the second RAT.

Figure 3:
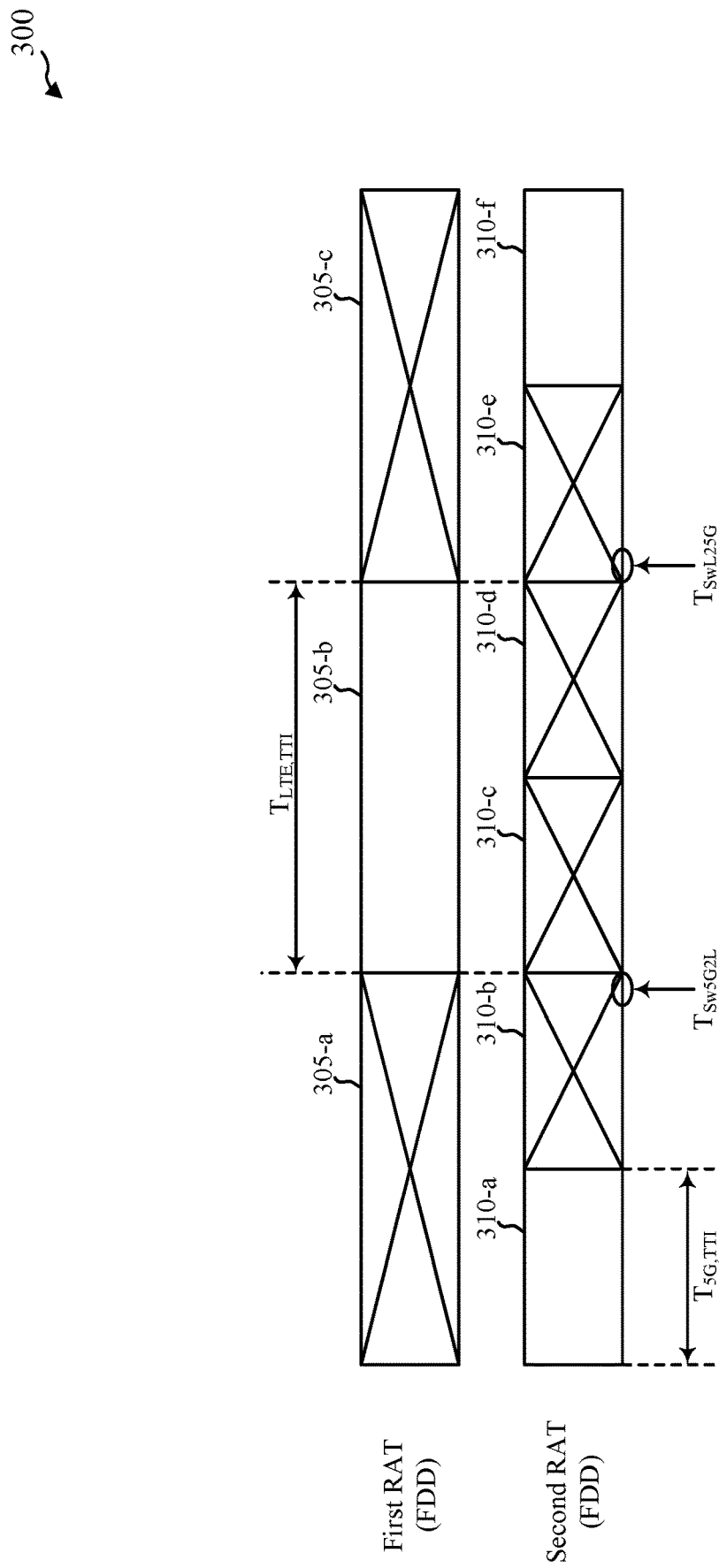
FIG. 3 shows a timing diagram of transmissions based on a first RAT (e.g., LTE/LTE-A) and transmissions based on a second RAT (e.g., 5G), in accordance with one or more aspects of the present disclosure.

FIG. 3 shows a timing diagram 300 of transmissions based on a first RAT (e.g., LTE/LTE-A) and transmissions based on a second RAT (e.g., 5G), in accordance with one or more aspects of the present disclosure. The transmissions based on the first RAT may be transmitted within a first series of TTIs (including, for example, a first TTI 305-a, a second TTI 305-b, and a third TTI 305-c), and the transmissions based on the second RAT may be transmitted within a second series of TTIs (including a fourth TTI 310-a, a fifth TTI 310-b, a sixth TTI 310-c, a seventh TTI 310-d, an eighth TTI 310-e, and a ninth TTI 310-f). By way of example, the TTIs 305 in the first series of TTIs may each have a duration of $T_{LTE,TTI}$, and the TTIs 310 in the second series of TTIs may each have a duration of $T_{5G,TTI}$, with $T_{5G,TTI} < T_{LTE,TTI}$. In some examples, $T_{5G,TTI}$ may be half of $T_{LTE,TTI}$, and a pair of TTIs 310 in the second series of TTIs may be aligned with, and transmitted during, one TTI 305 in the first series of TTIs. In some examples, $T_{LTE,TTI}=1$ millisecond (ms), and $T_{5G,TTI}=0.5$ ms.

In some examples, and at a given moment in time, transmissions may be made based on the first RAT or transmissions may be made based on the second RAT (but not both). This may be due to a sharing of a transmit chain, such that resources are available for just one type of transmission at a time, or due to interference between two or more types of transmissions, as described with reference to FIG. 2.

When a transmit chain is switched from transmitting based on the second RAT to transmitting based on the first RAT, there may be one or more TTIs 310 in which transmissions based on the second RAT cannot be made because the transmit chain is switched to the first RAT. For example, in FIG. 3, the transmit chain may be unable to transmit based on the second RAT during the sixth TTI 310-c and the seventh TTI 310-d because the sixth TTI 310-c and the seventh TTI 310-d occur during the second TTI 305-b (i.e., a TTI in which a transmission based on the first RAT is made). In addition, there may be non-zero transmission switching events that occur during the fifth TTI 310-b and the eighth TTI 310-e (e.g., $T_{Sw,5G2L}$ and $T_{Sw,L25G}$, which may occur as a transmit chain is switched between transmitting based on the second RAT and transmitting based on the first RAT), and these non-zero transmission switching events may interfere with an ability to transmit based on the second RAT. For example, the non-zero transmission switching events (e.g., $T_{Sw,5G2L}$ and $T_{Sw,L25G}$) may interfere with the available transmission format(s) for TTIs 310 in the second series of TTIs, thereby making the fifth TTI 310-b and the eighth TTI 310-e unusable for transmissions based on the second RAT. A transmission based on the first RAT, during the second TTI 305-b of the first series of TTIs, may therefore prevent a transmission based on the second RAT during each of the fifth TTI 310-b, the sixth TTI 310-c, the seventh TTI 310-d, and the eighth TTI 310-e of the second series of TTIs.

Figure 4:
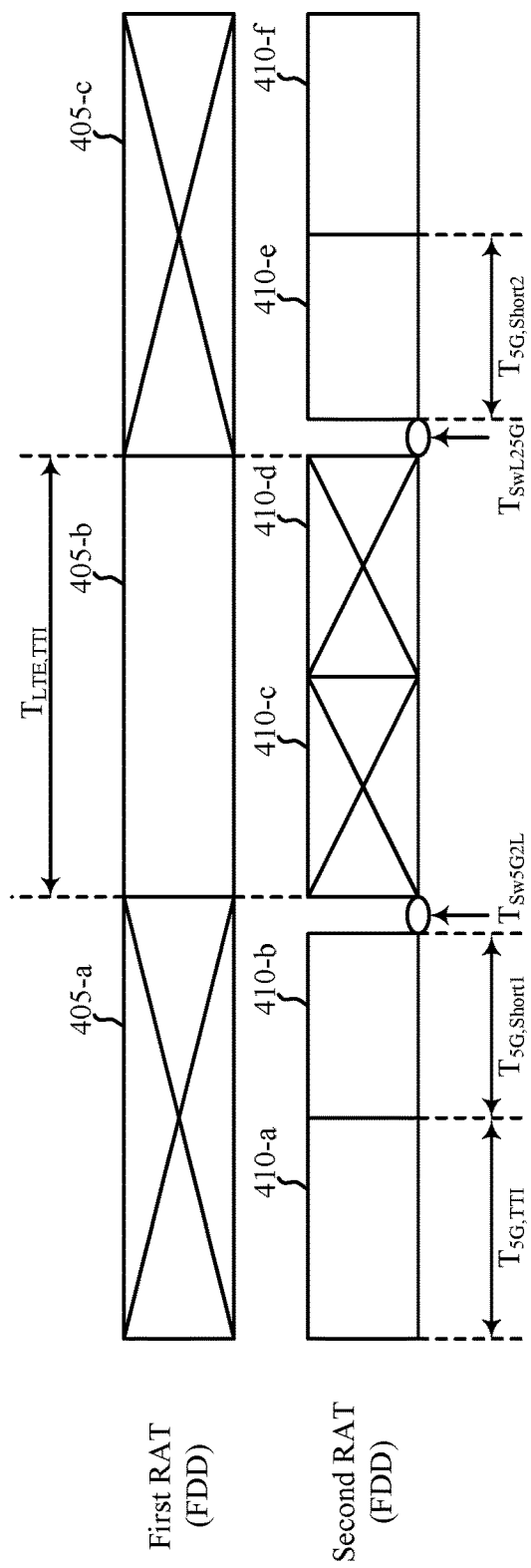
FIG. 4 shows a timing diagram of transmissions based on a first RAT (e.g., LTE/LTE-A) and transmissions based on a second RAT (e.g., 5G), in accordance with one or more aspects of the present disclosure.

FIG. 4 shows a timing diagram 400 of transmissions based on a first RAT (e.g., LTE/LTE-A) and transmissions based on a second RAT (e.g., 5G), in accordance with one or more aspects of the present disclosure. Alternatively, FIG. 4 shows an alternative to the timing diagram 300, in which the available transmission time for transmissions based on the second RAT may be increased. The transmissions based on the first RAT may be transmitted within a first series of TTIs (including, for example, a first TTI 405-a, a second TTI 405-b, and a third TTI 405-c), and the transmissions based on the second RAT may be transmitted within a second series of TTIs (including a fourth TTI 410-a, a fifth TTI 410-b, a sixth TTI 410-c, a seventh TTI 410-d, an eighth TTI 410-e, and a ninth TTI 410-f). By way of example, the TTIs 405 in the first series of TTIs may each have a duration of $T_{LTE,TTI}$, and the TTIs 410 in the second series of TTIs may each have a nominal duration of $T_{5G,TTI}$, with $T_{5G,TTI} < T_{LTE,TTI}$. In some examples, $T_{5G,TTI}$ may be half of $T_{LTE,TTI}$, and a pair of TTIs 410 in the second series of TTIs may be aligned with, and transmitted during, one TTI 405 in the first series of TTIs. In some examples, $T_{LTE,TTI}=1$ ms, and $T_{5G,TTI}=0.5$ ms.

In some examples, and at a given moment in time, transmissions may be made based on the first RAT or transmissions may be made based on the second RAT (but not both). This may be due to a sharing of a transmit chain, such that resources are available for just one type of transmission at a time, or due to interference between two or more types of transmissions, as described with reference to FIG. 2.

When a transmit chain is switched from transmitting based on the second RAT to transmitting based on the first RAT, there may be one or more TTIs 410 in which transmissions based on the second RAT cannot be made because the transmit chain is switched to the first RAT. For example, in FIG. 4, the transmit chain may be unable to transmit based on the second RAT during the sixth TTI 410-d and the seventh TTI 410-d because the sixth TTI 410-c and the seventh TTI 410-d occur during the second TTI 405-b (i.e., a TTI in which a transmission based on the first RAT is made). In addition, there may be non-zero transmission switching events that occur during the fifth TTI 410-b and the eighth TTI 410-e (e.g., $T_{Sw,5G2L}$ and $T_{Sw,L25G}$, which may occur as a transmit chain is switched between transmitting based on the second RAT and transmitting based on the first RAT), and these non-zero transmission switching events may interfere with an ability to transmit based on the second RAT. However, instead of ceasing to transmit during the entirety of the fifth TTI 410-b or the eighth TTI 410-e, a wireless communication device may, for each of the fifth TTI 410-b and the eighth TTI 410-e: determine an unavailable portion of the TTI; and determine, based on the unavailable portion of the TTI, a portion of the TTI (e.g., $T_{5G,Short1}$ or $T_{5G,Short2}$) available for a transmission that is shorter than the duration of the TTI. The unavailable portion of the TTI may have a duration based on a switching duration of a transmission switching event (e.g., a duration of $T_{Sw,5G2L}$ or $T_{Sw,L25G}$). In some examples, the transmission that is shorter than the duration of the TTI may include a shortened TTI.

In some examples, the wireless communication device may select a transmission format for transmitting the transmission that is shorter than the duration of the TTI (e.g., the duration of the fifth TTI 410-b or the eighth TTI 410-e) to a receiving device. In some examples, the transmission format may be selected from a plurality of transmission formats (e.g., from a plurality of transmission formats received from another wireless communication device, or from a plurality of transmission formats that are preconfigured on the wireless communication device). In some examples, the selected transmission format may include a shortened TTI transmission format. In some examples, the selected transmission format may include a puncturing of (e.g., a blanking or non-transmission of) at least one symbol of the TTI (e.g., at least one symbol of the fifth TTI 410-b or the eighth TTI 410-e), a non-transmission of at least one symbol of the TTI, or a combination thereof. In some examples, the selected transmission format may differ from a full-length TTI transmission format (e.g., a format for transmitting a TTI having a nominal or expected TTI duration, during the fourth TTI 410-a or the ninth TTI 410-f). The selected transmission format may additionally or alternatively differ from at least one other transmission format for at least one other transmission that is shorter than the duration of the TTI.

When a selected transmission format includes a puncturing of at least one symbol of a TTI, a receiving device may not be aware of the puncturing and try to decode a transmission received during the TTI assuming a full-length TTI transmission. In some examples, the likelihood that the receiving device may successfully decode the transmission may be increased by limiting the amount of puncturing.

In some examples, the wireless communication device may explicitly or implicitly indicate a timing of the transmission that is shorter than the duration of the TTI (e.g., shorter than the duration $T_{5G,TTI}$) to a receiving device. In some examples, indicating the timing of the transmission may include indicating a start time of the transmission, a stop time of the transmission, a duration of the transmission, or a combination thereof. In some examples, the timing of the transmission may be indicated by transmitting a reference signal (e.g., a demodulation reference signal (DM-RS), cell-specific reference signal (CRS), or sounding reference signal (SRS)) in a first reference signal location that differs from a second reference signal location of a full-length TTI transmission (e.g., a transmission having a duration of $T_{5G,TTI}$), or by transmitting at least one reference signal at a first reference signal density (e.g., number of reference signals per TTI or other time period) that differs from a second reference signal density. The second reference signal density may be a reference signal density associated with a full-length TTI transmission. In some examples, the timing of the transmission may be indicated by transmitting a predetermined sequence, such as a preamble sequence, a pilot symbol configuration, or a combination thereof. The predetermined sequence may be transmitted, for example, at a start of the transmission, an end of the transmission, or a combination thereof.

By transmitting a transmission that is shorter than a duration of the fifth TTI 410-b or the eighth TTI 410-e, or by transmitting a shortened TTI, portions of the fifth TTI 410-b and the eighth TTI 410-e may be recovered and used for transmissions based on the second RAT, which may improve the efficiency of transmit sharing between the first RAT and the second RAT.

Figure 5:
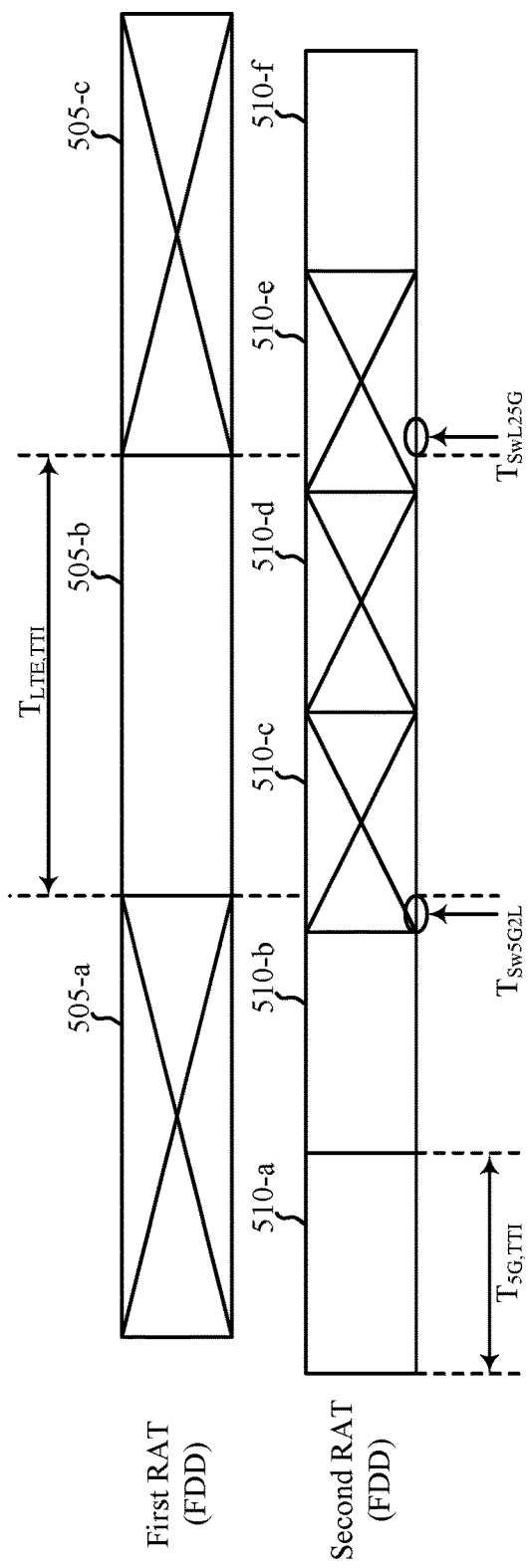
FIG. 5 shows a timing diagram of transmissions based on a first RAT (e.g., LTE/LTE-A) and transmissions based on a second RAT (e.g., 5G), in accordance with one or more aspects of the present disclosure.

FIG. 5 shows a timing diagram 500 of transmissions based on a first RAT (e.g., LTE/LTE-A) and transmissions based on a second RAT (e.g., 5G), in accordance with one or more aspects of the present disclosure. The transmissions based on the first RAT may be transmitted within a first series of TTIs (including, for example, a first TTI 505-a, a second TTI 505-b, and a third TTI 505-c), and the transmissions based on the second RAT may be transmitted within a second series of TTIs (including a fourth TTI 510-a, a fifth TTI 510-b, a sixth TTI 510-c, a seventh TTI 510-d, an eighth TTI 510-e, and a ninth TTI 510-f). By way of example, the TTIs 505 in the first series of TTIs may each have a duration of $T_{LTE,TTI}$, and the TTIs 510 in the second series of TTIs may each have a duration of $T_{5G,TTI}$, with $T_{5G,TTI}<T_{LTE,TTI}$. In some examples, $T_{5G,TTI}$ may be half of $T_{LTE,TTI}$, and a pair of TTIs 510 in the second series of TTIs may be transmitted in the same span of time as one TTI 505 in the first series of TTIs. However, the boundaries of the pair of TTIs 510 in the second series of TTIs may be offset (or not aligned) with the boundaries of the one TTI 505 in the first set of TTIs. In some examples, $T_{LTE,TTI}=1$ ms, and $T_{5G,TTI}=0.5$ ms.

In some examples, and at a given moment in time, transmissions may be made based on the first RAT or transmissions may be made based on the second RAT (but not both). This may be due to a sharing of a transmit chain, such that resources are available for just one type of transmission at a time, or due to interference between two or more types of transmissions, as described with reference to FIG. 2. When a transmit chain is switched from transmitting based on the second RAT to transmitting based on the first RAT, there may be one or more TTIs 510 in which transmissions based on the second RAT cannot be made because the transmit chain is switched to the first RAT. For example, in FIG. 5, the transmit chain may be unable to transmit based on the second RAT during the sixth TTI 510-c, the seventh TTI 510-d, and the eighth TTI 510-e because the sixth TTI 510-c, the seventh TTI 510-d, and the eighth TTI 510-e occur during (or overlap) the second TTI 505-b (i.e., a TTI in which a transmission based on the first RAT is made). There may also be non-zero transmission switching events that occur during the sixth TTI 510-c and the eighth TTI 510-e (e.g., $T_{Sw,5G2L}$ and $T_{Sw,L25G}$, which may occur as a transmit chain is switched between transmitting based on the second RAT and transmitting based on the first RAT). However, in the timing diagram 500, these non-zero transmission switching events occur during TTIs 510 in which a wireless communication device is already unable to transmit based on the second RAT. In accordance with the timing diagram 500, a transmission based on the first RAT, during the second TTI 505-b of the first series of TTIs, may therefore prevent a transmission based on the second RAT during each of the sixth TTI 510-c, the seventh TTI 510-d, and the eighth TTI 510-e of the second series of TTIs.

Figure 6:
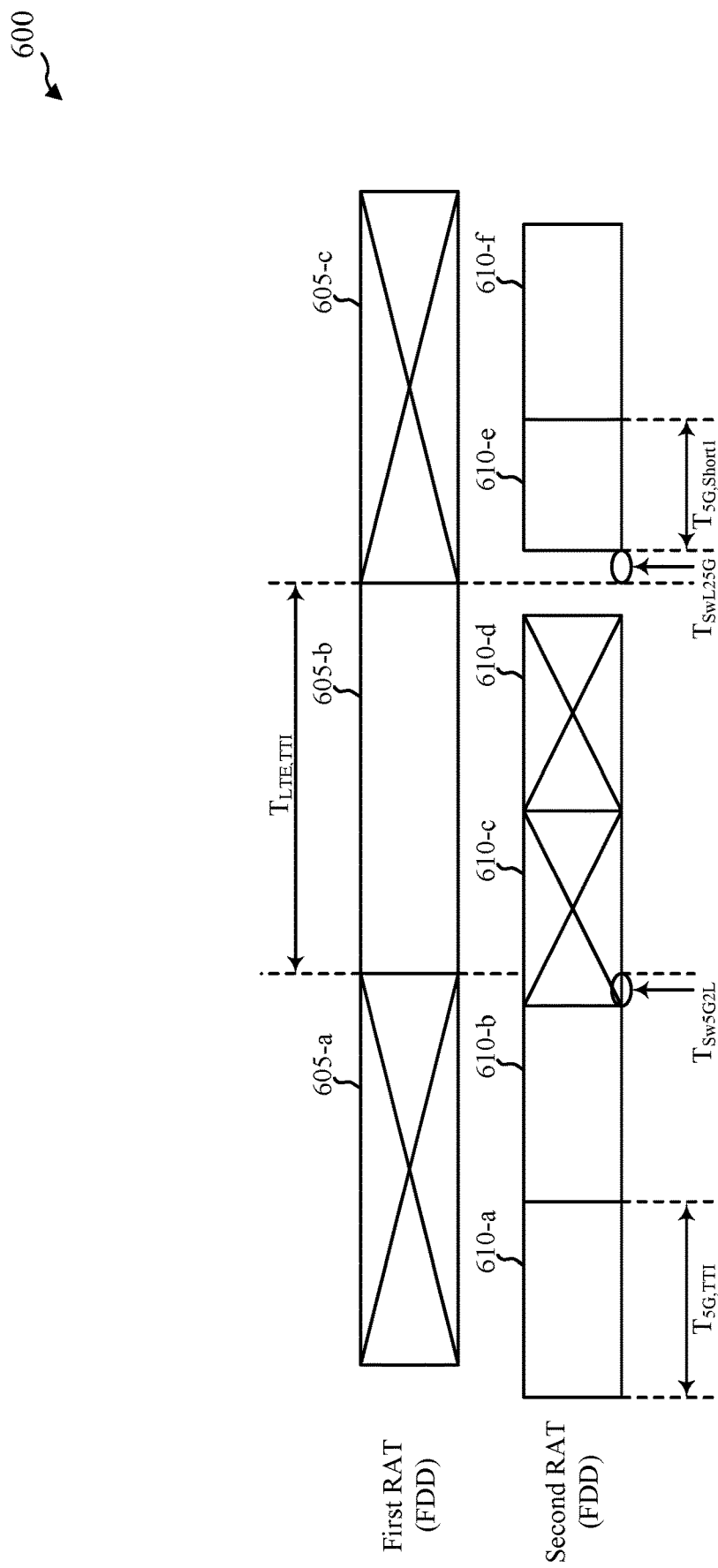
FIG. 6 shows a timing diagram of transmissions based on a first RAT (e.g., LTE/LTE-A) and transmissions based on a second RAT (e.g., 5G), in accordance with one or more aspects of the present disclosure.

FIG. 6 shows a timing diagram 600 of transmissions based on a first RAT (e.g., LTE/LTE-A) and transmissions based on a second RAT (e.g., 5G), in accordance with one or more aspects of the present disclosure. Alternatively, FIG. 6 shows an alternative to the timing diagram 500, in which the available transmission time for transmissions based on the second RAT may be increased. The transmissions based on the first RAT may be transmitted within a first series of TTIs (including, for example, a first TTI 605-a, a second TTI 605-b, and a third TTI 605-c), and the transmissions based on the second RAT may be transmitted within a second series of TTIs (including a fourth TTI 610-a, a fifth TTI 610-b, a sixth TTI 610-c, a seventh TTI 610-d, an eighth TTI 610-e, and a ninth TTI 610-f). By way of example, the TTIs 605 in the first series of TTIs may each have a duration of $T_{LTE,TTI}$, and the TTIs 610 in the second series of TTIs may each have a duration of $T_{5G,TTI}$, with $T_{5G,TTI}<T_{LTE,TTI}$. In some examples, $T_{5G,TTI}$ may be half of $T_{LTE,TTI}$, and a pair of TTIs 610 in the second series of TTIs may be transmitted in the same span of time as one TTI 605 in the first series of TTIs. However, the boundaries of the pair of TTIs 610 in the second series of TTIs may be offset (or not aligned) with the boundaries of the one TTI 605 in the first set of TTIs. In some examples, $T_{LTE,TTI}=1$ ms, and $T_{5G,TTI}=0.5$ ms.

In some examples, and at a given moment in time, transmissions may be made based on the first RAT or transmissions may be made based on the second RAT (but not both). This may be due to a sharing of a transmit chain, such that resources are available for just one type of transmission at a time, or due to interference between two or more types of transmissions, as described with reference to FIG. 2.

When a transmit chain is switched from transmitting based on the second RAT to transmitting based on the first RAT, there may be one or more TTIs 610 in which transmissions based on the second RAT cannot be made because the transmit chain is switched to the first RAT. For example, in FIG. 6, the transmit chain may be unable to transmit based on the second RAT during the sixth TTI 610-c, the seventh TTI 610-d, and the eighth TTI 610-e because the sixth TTI 610-c, the seventh TTI 610-d, and the eighth TTI 610-e occur during (or overlap) the second TTI 605-b (i.e., a TTI in which a transmission based on the first RAT is made). However, instead of ceasing to transmit during the entirety of the eighth TTI 610-e, a wireless communication device may determine an unavailable portion of the eighth TTI 610-*e*; and determine, based on the unavailable portion of the eighth TTI 610-*e*, a portion of the eighth TTI 610-*e* (e.g., $T_{5G,Short1}$) available for a transmission that is shorter than the duration of the eighth TTI 610-*e*. The unavailable portion of the eighth TTI 610-*e* may have a duration based on an offset between boundaries of the first series of TTIs and the second series of TTI and/or a switching duration of a transmission switching event (e.g., a duration of $T_{Sw,L25G}$). In some examples, the transmission that is shorter than the duration of the TTI may include a shortened TTI.

In some examples, the wireless communication device may select a transmission format for transmitting the transmission that is shorter than the duration of the eighth TTI 610-*e* to a receiving device. In some examples, the transmission format may be selected from a plurality of transmission formats (e.g., from a plurality of transmission formats received from another wireless communication device, or from a plurality of transmission formats that are preconfigured on the wireless communication device). In some examples, the selected transmission format may include a shortened TTI transmission format. In some examples, the selected transmission format may include a puncturing of (e.g., a blanking or non-transmission of) at least one symbol of the eighth TTI 610-*e*, a non-transmission of at least one symbol of the eighth TTI 610-*e*, or a combination thereof. In some examples, the selected transmission format may differ from a full-length TTI transmission format (e.g., a format for transmitting during the fourth TTI 610-*a*, the fifth TTI 610-*b*, or the ninth TTI 610-*f*). The selected transmission format may additionally or alternatively differ from at least one other transmission format for at least one other transmission that is shorter than the duration of the eighth TTI 610-*e*.

When a selected transmission format includes a puncturing of at least one symbol of a TTI, a receiving device may not be aware of the puncturing and try to decode a transmission received during the TTI assuming a full-length TTI transmission. In some examples, the likelihood that the receiving device may successfully decode the transmission may be increased by limiting the amount of puncturing.

In some examples, the wireless communication device may explicitly or implicitly indicate a timing of the transmission that is shorter than the duration of the eighth TTI 610-*e* (or shorter than the duration $T_{5G,TTI}$) to a receiving device. In some examples, indicating the timing of the transmission may include indicating a start time of the transmission, a stop time of the transmission, a duration of the transmission, or a combination thereof. In some examples, the timing of the transmission may be indicated by transmitting a reference signal in a first reference signal location that differs from a second reference signal location of a full-length TTI transmission (e.g., a transmission having a duration of $T_{5G,TTI}$), or by transmitting at least one reference signal at a first reference signal density that differs from a second reference signal density. The second reference signal density may be a reference signal density associated with a full-length TTI transmission. In some examples, the timing of the transmission may be indicated by transmitting a predetermined sequence, such as a preamble sequence, a pilot symbol configuration, or a combination thereof. The predetermined sequence may be transmitted, for example, at a start of the transmission, an end of the transmission, or a combination thereof.

By transmitting a transmission that is shorter than a duration of the eighth TTI 610-*e*, or by transmitting a shortened TTI, a portion of the eighth TTI 610-*e* may be recovered and used for transmissions based on the second RAT, which may improve the efficiency of transmit sharing between the first RAT and the second RAT.

Figure 7:
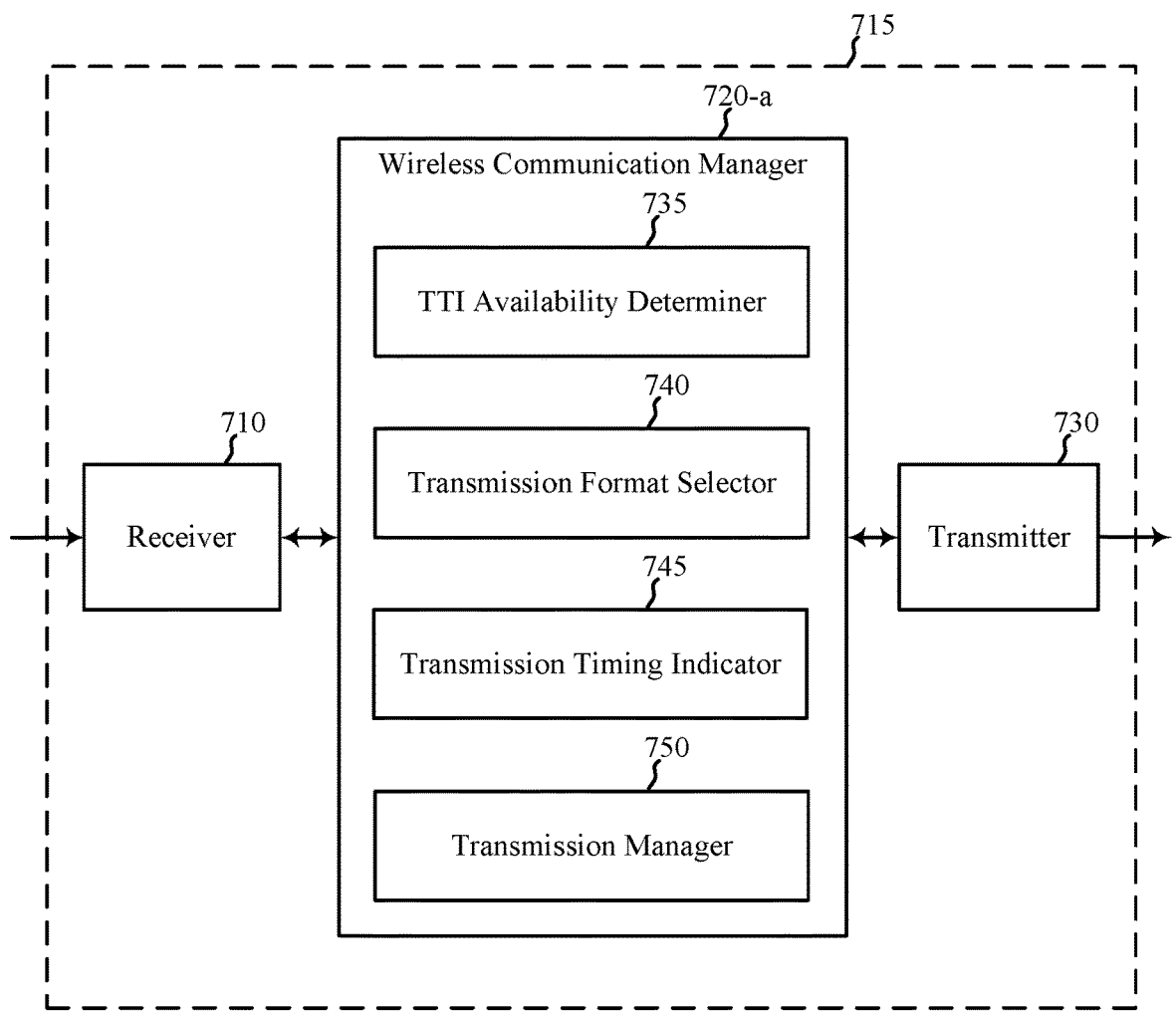
FIG. 7 shows a block diagram of an apparatus for use in wireless communication, in accordance with one or more aspects of the present disclosure.

FIG. 7 shows a block diagram 700 of an apparatus 715 for use in wireless communication, in accordance with one or more aspects of the present disclosure. The apparatus 715 may be an example of aspects of one or more of the UEs 115 described with reference to FIG. 1 or 2. The apparatus 715 may also be or include a processor. The apparatus 715 may include a receiver 710, a wireless communication manager 720-*a*, or a transmitter 730. Each of these components may be in communication with each other.

The components of the apparatus 715 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Array (FPGA), a System-on-Chip (SoC), and/or other types of Semi-Custom ICs), which may be programmed in any manner known in the art. The functions of each component may also be implemented, in whole or in part, with instructions implemented in a memory, formatted to be executed by one or more general or application-specific processors.

In some examples, the receiver 710 may include at least one radio frequency (RF) receiver, such as at least one RF receiver operable to receive transmissions over one or more RF spectrum bands. In some examples, the one or more RF spectrum bands may be used for LTE/LTE-A or 5G communications, as described, for example, with reference to FIG. 1, 2, 3, 4, 5, or 6. The receiver 710 may be used to receive various types of data or control signals (i.e., transmissions) over one or more communication links of a wireless communication system, such as one or more communication links 125 of the wireless communication system 100 described with reference to FIG. 1.

In some examples, the transmitter 730 may include at least one RF transmitter, such as at least one RF transmitter operable to transmit over one or more RF spectrum bands. In some examples, the one or more RF spectrum bands may be used for LTE/LTE-A or 5G communications, as described, for example, with reference to FIG. 1, 2, 3, 4, 5, or 6. The transmitter 730 may be used to transmit various types of data or control signals (i.e., transmissions) over one or more communication links of a wireless communication system, such as one or more communication links 125 of the wireless communication system 100 described with reference to FIG. 1.

In some examples, the wireless communication manager 720-*a* may be used to manage one or more aspects of wireless communication for the apparatus 715. In some examples, part of the wireless communication manager 720-*a* may be incorporated into or shared with the receiver 710 or the transmitter 730. In some examples, the wireless communication manager 720-*a* may be an example of aspects of the wireless communication manager 720 described with reference to FIG. 1. In some examples, the wireless communication manager 720-*a* may include a TTI availability determiner 735, a transmission format selector 740, a transmission timing indicator 745, or a transmission manager 750.

The TTI availability determiner 735 may be used to determine a portion of a TTI is available for a transmission that is shorter than a duration of the TTI. In some examples, the portion of the TTI may be determined based at least in part on a transmission switching event occurring during the TTI (as described with reference to FIGS. 3 and 4), or based at least in part on a timing difference between a first transmission based on a first RAT and a second transmission based on a second RAT (as described with reference to FIGS. 5 and 6). In some examples, the transmission that is shorter than the duration of the TTI may include a shortened TTI.

The transmission format selector 740 may be used to select a transmission format for transmitting the transmission to a receiving device during the portion of the TTI. In some examples, the transmission format may be selected from a plurality of transmission formats. For example, the transmission format selector 740 may receive a plurality of transmission formats (e.g., from a network access device), and may select a transmission format for transmitting the transmission from the plurality of transmission formats. Alternatively, the transmission format selector 740 may be preconfigured with the plurality of transmission formats, or may receive the plurality of transmission formats in other ways. In some examples, the selected transmission format may include a shortened TTI transmission format. In some examples, the transmission format may include a puncturing of at least one symbol of the TTI, a non-transmission of at least one symbol of the TTI, or a combination thereof. In some examples, the transmission format may differ from a full-length TTI transmission format, at least one other transmission format for at least one other transmission that is shorter than the duration of the TTI, or a combination thereof.

The transmission timing indicator 745 may be used to indicate a timing of the transmission to the receiving device. In some examples, indicating the timing of the transmission may include indicating a start time of the transmission, a stop time of the transmission, a duration of the transmission, or a combination thereof. In some examples, the timing of the transmission may be indicated by transmitting a reference signal in a first reference signal location that differs from a second reference signal location of a full-length TTI transmission, or by transmitting at least one reference signal at a first reference signal density that differs from a second reference signal density. The second reference signal density may be a reference signal density associated with a full-length TTI transmission. In some examples, the timing of the transmission may be indicated by transmitting a predetermined sequence, such as a preamble sequence, a pilot symbol configuration, or a combination thereof. The predetermined sequence may be transmitted, for example, at a start of the transmission, an end of the transmission, or a combination thereof.

The transmission manager 750 may be used to transmit the transmission to the receiving device. In some examples, the transmission timing indicator 745 may indicate the timing of the transmission to the receiving device as part of the transmission.

Figure 8:
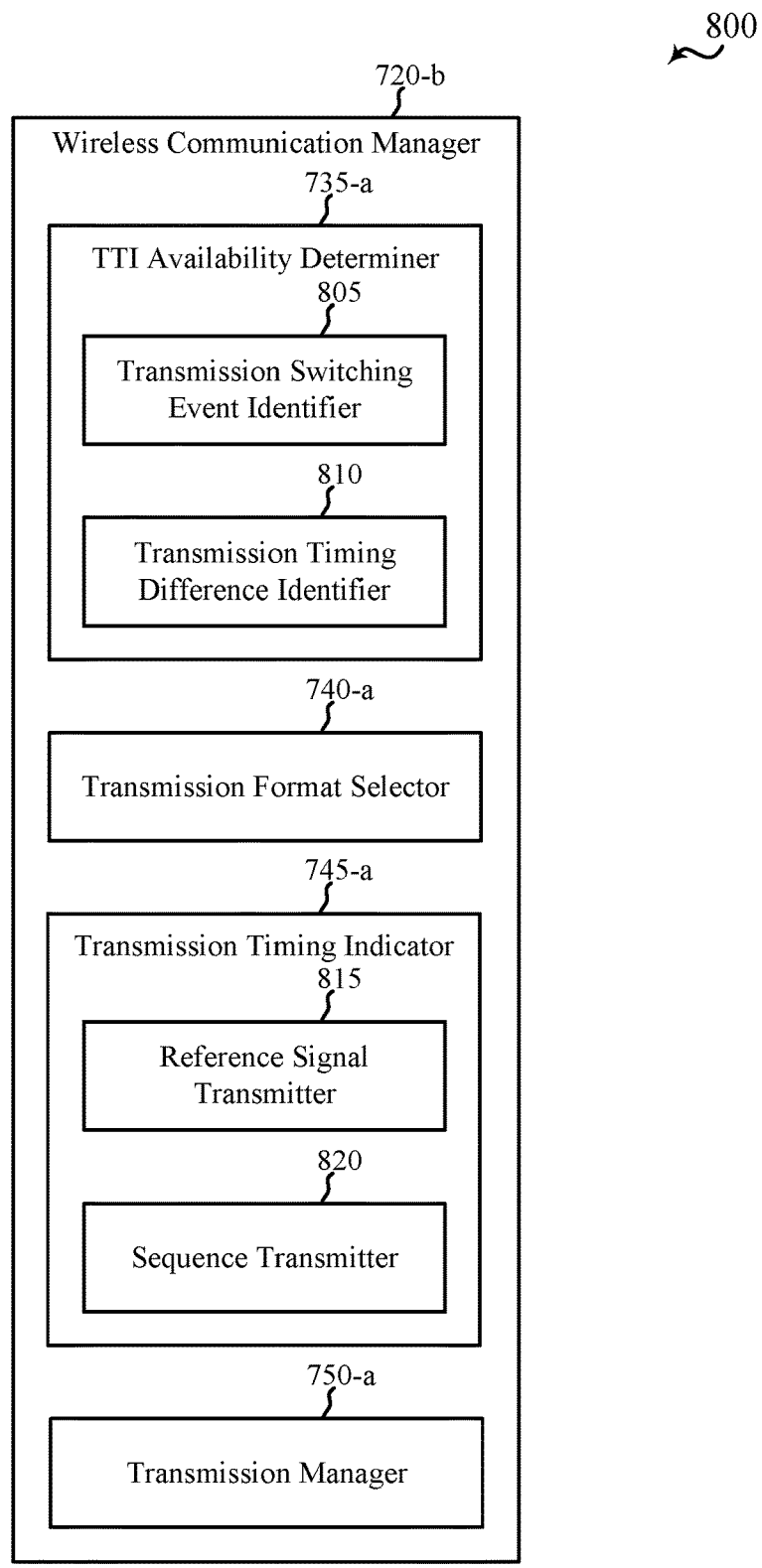
FIG. 8 shows a block diagram of a wireless communication manager for use in wireless communication, in accordance with one or more aspects of the present disclosure.

FIG. 8 shows a block diagram 800 of a wireless communication manager 720-*b* for use in wireless communication, in accordance with one or more aspects of the present disclosure. The wireless communication manager 720-*b* may be an example of aspects of the wireless communication manager 720 or 720-*a* described with reference to FIG. 1 or 7.

The components of the wireless communication manager 720-*b* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions implemented in a memory, formatted to be executed by one or more general or application-specific processors.

In some examples, the wireless communication manager 720-*b* may be used to manage one or more aspects of wireless communication for a wireless communication device (e.g., a UE) or apparatus, such as one of the UEs 115 or apparatus 715 described with reference to FIG. 1, 2, or 7. In some examples, part of the wireless communication manager 720-*b* may be incorporated into or shared with a receiver or a transmitter (e.g., the receiver 710 or the transmitter 730 described with reference to FIG. 7). In some examples, the wireless communication manager 720-*b* may include a TTI availability determiner 735-*a*, a transmission format selector 740-*a*, a transmission timing indicator 745-*a*, or a transmission manager 750-*a*.

The TTI availability determiner 735-*a* may be used to determine a portion of a TTI is available for a transmission that is shorter than a duration of the TTI. In some examples, the transmission that is shorter than the duration of the TTI may include a shortened TTI. In some examples, the TTI availability determiner 735-*a* may include a transmission switching event identifier 805 or a transmission timing difference identifier 810.

In some examples of the wireless communication manager 720-*b*, the transmission switching event identifier 805 may be used to identify a transmission switching event as occurring during the TTI. In some examples, the transmission switching event may include switching from a first transmission according to a first RAT to a second transmission according to a second RAT, or switching from the second transmission according to the second RAT to the first transmission according to the first RAT. The TTI availability determiner 735-*a* may then identify an unavailable portion of the TTI. The unavailable portion of the TTI may have a duration based at least in part on a switching duration of the transmission switching event. The TTI availability determiner 735-*a* may additionally determine the portion of the TTI available for the transmission that is shorter than the duration of the TTI. The TTI availability determiner 735-*a* may determine the portion of the TTI available for the transmission that is shorter than the duration of the TTI based at least in part on the unavailable portion of the TTI.

In some examples of the wireless communication manager 720-*b*, the transmission timing difference identifier 810 may be used to identify a timing difference between a first transmission based on a first RAT and a second transmission based on a second RAT (as described with reference to FIGS. 5 and 6). The TTI availability determiner 735-*a* may then determine the portion of the TTI available for the transmission that is shorter than the duration of the TTI. The TTI availability determiner 735-*a* may determine the portion of the TTI available for the transmission that is shorter than the duration of the TTI based at least in part on the timing difference between the first transmission based on the first RAT and the second transmission based on the second RAT.

The transmission format selector 740-*a* may be used to select a transmission format for transmitting the transmission to a receiving device during the portion of the TTI. In some examples, the transmission format may be selected from a plurality of transmission formats. For example, the transmission format selector 740 may receive a plurality of transmission formats (e.g., from a network access device), and may select a transmission format for transmitting the transmission from the plurality of transmission formats. Alternatively, the transmission format selector 740-*a* may be preconfigured with the plurality of transmission formats, or may receive the plurality of transmission formats in other ways. In some examples, the selected transmission format may include a shortened TTI transmission format. In some examples, the transmission format may include a puncturing of at least one symbol of the TTI, a non-transmission of at least one symbol of the TTI, or a combination thereof. In some examples, the transmission format may differ from a full-length TTI transmission format, at least one other transmission format for at least one other transmission that is shorter than the duration of the TTI, or a combination thereof.

The transmission timing indicator 745-*a* may be used to indicate a timing of the transmission to the receiving device. In some examples, indicating the timing of the transmission may include indicating a start time of the transmission, a stop time of the transmission, a duration of the transmission, or a combination thereof. In some examples, the transmission timing indicator 745-*a* may include a reference signal transmitter 815 or a sequence transmitter 820. The reference signal transmitter 815 may be used to indicate the timing of the transmission by transmitting a reference signal in a first reference signal location that differs from a second reference signal location of a full-length TTI transmission, or by transmitting at least one reference signal at a first reference signal density that differs from a second reference signal density. The second reference signal density may be a reference signal density associated with a full-length TTI transmission. In some examples, the sequence transmitter 820 may be used to indicate the timing of the transmission by transmitting a predetermined sequence, such as a preamble sequence, a pilot symbol configuration, or a combination thereof. The predetermined sequence may be transmitted, for example, at a start of the transmission, an end of the transmission, or a combination thereof.

The transmission manager 750-*a* may be used to transmit the transmission to the receiving device. In some examples, the transmission timing indicator 745 may indicate the timing of the transmission to the receiving device as part of the transmission.

Figure 9:
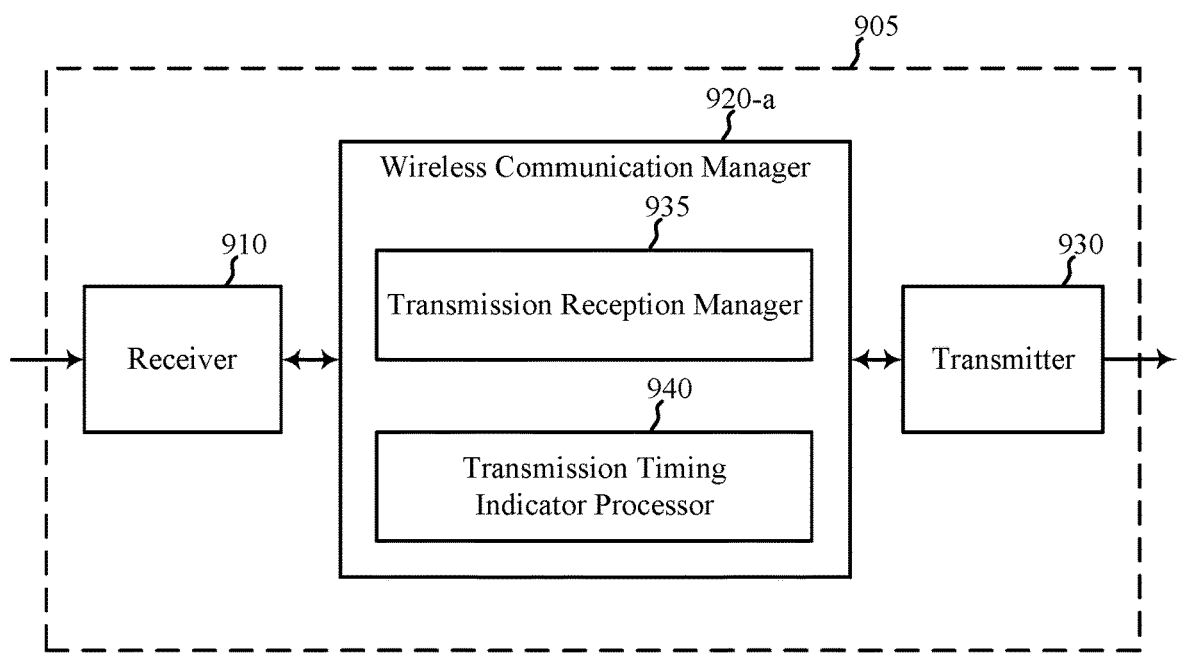
FIG. 9 shows a block diagram of an apparatus for use in wireless communication, in accordance with one or more aspects of the present disclosure.

FIG. 9 shows a block diagram 900 of an apparatus 905 for use in wireless communication, in accordance with one or more aspects of the present disclosure. The apparatus 905 may be an example of aspects of one or more of the network access device 105 (e.g., an eNB, an ANC, a RH, or a base station) described with reference to FIG. 1 or 2. The apparatus 905 may also be or include a processor. The apparatus 905 may include a receiver 910, a wireless communication manager 920-*a*, or a transmitter 930. Each of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions implemented in a memory, formatted to be executed by one or more general or application-specific processors.

In some examples, the receiver 910 may include at least one RF receiver, such as at least one RF receiver operable to receive transmissions over one or more RF spectrum bands. In some examples, the one or more RF spectrum bands may be used for LTE/LTE-A or 5G communications, as described, for example, with reference to FIG. 1, 2, 3, 4, 5, or 6. The receiver 910 may be used to receive various types of data or control signals (i.e., transmissions) over one or more communication links of a wireless communication system, such as one or more communication links of the wireless communication system 100 described with reference to FIG. 1.

In some examples, the transmitter 930 may include at least one RF transmitter, such as at least one RF transmitter operable to transmit over one or more RF spectrum bands. In some examples, the one or more RF spectrum bands may be used for LTE/LTE-A or 5G communications, as described, for example, with reference to FIG. 1, 2, 3, 4, 5, or 6. The transmitter 930 may be used to transmit various types of data or control signals (i.e., transmissions) over one or more communication links of a wireless communication system, such as one or more communication links of the wireless communication system 100 described with reference to FIG. 1.

In some examples, the wireless communication manager 920-*a* may be used to manage one or more aspects of wireless communication for the apparatus 905. In some examples, part of the wireless communication manager 920-*a* may be incorporated into or shared with the receiver 910 or the transmitter 930. In some examples, the wireless communication manager 920-*a* may be an example of aspects of the wireless communication manager 920 described with reference to FIG. 1. In some examples, the wireless communication manager 920-*a* may include a transmission reception manager 935 or a transmission timing indicator processor 940.

The transmission reception manager 935 may be used to receive from a transmitting device, during a TTI, a transmission that is shorter than a duration of the TTI. In some examples, the transmission that is shorter than the duration of the TTI may include a shortened TTI. The transmission reception manager 935 may identify the transmission based at least in part on an indication of a timing of the transmission.

The transmission timing indicator processor 940 may be used to receive, from the transmitting device, the indication of the timing of the transmission received by the transmission reception manager 935. In some examples, the indication of the timing of the transmission may indicate a start time of the transmission, a stop time of the transmission, a duration of the transmission, or a combination thereof. In some examples, the indication of the timing of the transmission may be received as part of the transmission received by the transmission reception manager 935.

Figure 10:
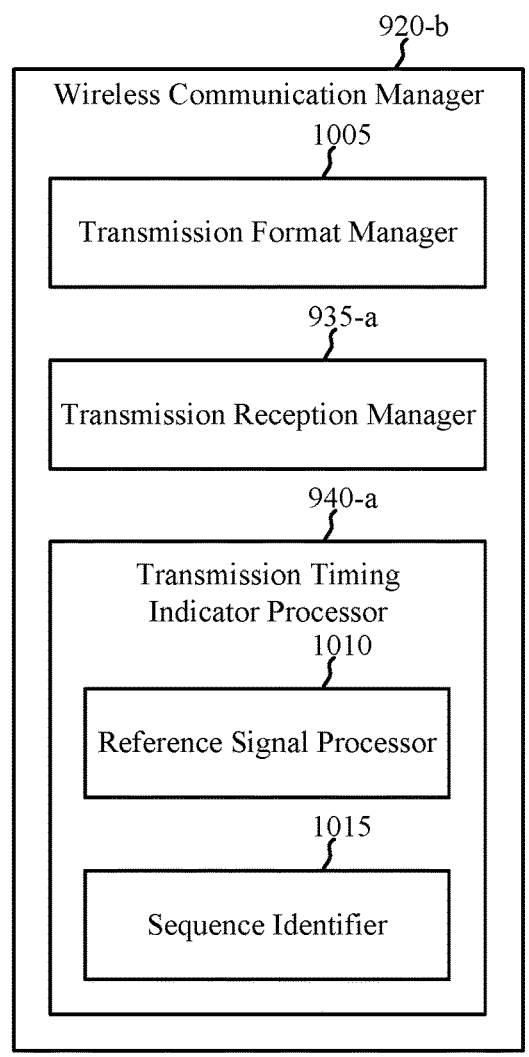
FIG. 10 shows a block diagram of a wireless communication manager for use in wireless communication, in accordance with one or more aspects of the present disclosure.

FIG. 10 shows a block diagram 1000 of a wireless communication manager 920-*b* for use in wireless communication, in accordance with one or more aspects of the present disclosure. The wireless communication manager 920-*b* may be an example of aspects of the wireless communication manager 920 or 920-*a* described with reference to FIG. 1 or 9.

The components of the wireless communication manager 920-*b* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions implemented in a memory, formatted to be executed by one or more general or application-specific processors.

In some examples, the wireless communication manager **920-*b* may be used to manage one or more aspects of wireless communication for a wireless communication device (e.g., a network access device) or apparatus, such as one of the network access device 105 (e.g., an eNB, an ANC, a RH, or a base station) or apparatus 905 described with reference to FIG. 1, 2, or 9. In some examples, part of the wireless communication manager 920-*b* may be incorporated into or shared with a receiver or a transmitter (e.g., the receiver 910 or the transmitter 930 described with reference to FIG. 9). In some examples, the wireless communication manager 920-*b* may include a transmission format manager 1005, a transmission reception manager 935-*a*, or a transmission timing indicator processor 940-*a***.

The transmission format manager 1005 may be used to transmit a plurality of transmission formats (e.g., to one or more UEs). In some examples, the transmission formats may include one or more transmissions formats that differ from one or more full-length TTI transmission formats, one or more transmission formats for transmissions shorter than a duration of a full-length TTI, or a combination thereof. In some examples, one or more of the transmission formats may include a puncturing of at least one symbol of a full-length TTI, a non-transmission of at least one symbol of a full-length TTI, or a combination thereof. In some examples, the transmission formats may include shortened TTI transmission formats.

The transmission reception manager **935-*a* may be used to receive from a transmitting device, during a TTI, a transmission that is shorter than a duration of the TTI. In some examples, the transmission that is shorter than the duration of the TTI may include a shortened TTI. The transmission reception manager 935-*a*** may identify the transmission based at least in part on an indication of a timing of the transmission.

The transmission timing indicator processor **940-*a* may be used to receive, from the transmitting device, the indication of the timing of the transmission received by the transmission reception manager 935-*a*. In some examples, the indication of the timing of the transmission may indicate a start time of the transmission, a stop time of the transmission, a duration of the transmission, or a combination thereof. In some examples, the indication of the timing of the transmission may be received as part of the transmission received by the transmission reception manager 935-*a*. In some examples, the transmission timing indicator processor 940-*a* may include a reference signal processor 1010 or a sequence identifier 1015**.

In some examples of the wireless communication manager **920-*b*, the reference signal processor 1010 may be used to process at least one reference signal that indicates the timing of the transmission received by the transmission reception manager 935-*a***. In some examples, the reference signal(s) may indicate the timing of the transmission it is received in a first reference signal location that differs from a second reference signal location of a full-length TTI transmission. In some examples, the reference signal(s) may be received at a first reference signal density that differs from a second reference signal density. The second reference signal density may be a reference signal density associated with a full-length TTI transmission.

In some examples of the wireless communication manager **920-*b*, the sequence identifier 1015 may be used to identify a predetermined sequence that indicates the timing of the transmission received by the transmission reception manager 935-*a***. In some examples, the predetermined sequence may include a preamble sequence, a pilot symbol configuration, or a combination thereof. The predetermined sequence may be received, for example, at a start of the transmission, an end of the transmission, or a combination thereof.

Figure 11:
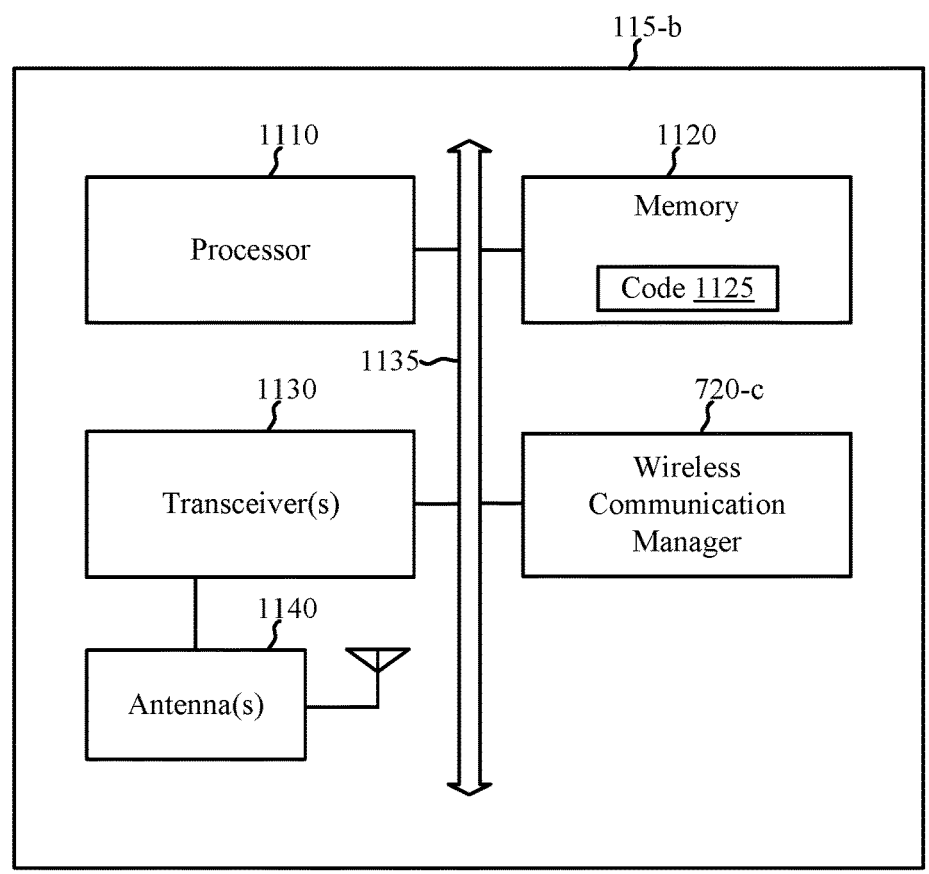
FIG. 11 shows a block diagram of a UE for use in wireless communication, in accordance with one or more aspects of the present disclosure.

FIG. 11 shows a block diagram 1100 of a UE **115-*b* for use in wireless communication, in accordance with one or more aspects of the present disclosure. The UE 115-*b* may be included or be part of a personal computer (e.g., a laptop computer, a netbook computer, a tablet computer, etc.), a cellular telephone, a PDA, a DVR, an internet appliance, a gaming console, an e-reader, a vehicle, a home appliance, a lighting or alarm control system, etc. The UE 115-*b* may, in some examples, have an internal power supply (not shown), such as a small battery, to facilitate mobile operation. In some examples, the UE 115-*b* may be an example of aspects of one or more of the UEs 115 described with reference to FIG. 1, or aspects of the apparatus 715 described with reference to FIG. 7. The UE 115-*b* may be configured to implement at least some of the UE or apparatus techniques and functions described with reference to FIG. 1, 2, 3, 4, 5, 6, 7, or 8**.

The UE **115-*b* may include a processor 1110, a memory 1120, at least one transceiver (represented by transceiver(s) 1130), at least one antenna (represented by antenna(s) 1140), or a wireless communication manager 720-*c*. Each of these components may be in communication with each other, directly or indirectly, over one or more buses 1135**.

The memory 1120 may include random access memory (RAM) or read-only memory (ROM). The memory 1120 may store computer-readable, computer-executable code 1125 containing instructions that are configured to, when executed, cause the processor 1110 to perform various functions described herein related to wireless communication, including, for example, determining a portion of a TTI is available for a transmission that is shorter than a duration of the TTI, selecting a transmission format from a plurality of transmission formats for transmitting the transmission to a receiving device during the portion of the TTI, and indicating a timing of the transmission to the receiving device. Alternatively, the computer-executable code 1125 may not be directly executable by the processor 1110 but be configured to cause the UE **115-*b*** (e.g., when compiled and executed) to perform various of the functions described herein.

The processor 1110 may include an intelligent hardware device, e.g., a central processing unit (CPU), a microcontroller, an ASIC, etc. The processor 1110 may process information received through the transceiver(s) 1130 or information to be sent to the transceiver(s) 1130 for transmission through the antenna(s) 1140. The processor 1110 may handle, alone or in connection with the wireless communication manager **720-*c***, various aspects of communicating over (or managing communications over) one or more RF spectrum bands.

The transceiver(s) 1130 may include a modem configured to modulate packets and provide the modulated packets to the antenna(s) 1140 for transmission, and to demodulate packets received from the antenna(s) 1140. The transceiver(s) 1130 may, in some examples, be implemented as one or more transmitters and one or more separate receivers. The transceiver(s) 1130 may support communications in one or more RF spectrum bands. The transceiver(s) 1130 may be configured to communicate bi-directionally, via the antenna(s) 1140, with one or more of the network access devices 105 described with reference to FIG. 1 or 2, or the apparatus 905 described with reference to FIG. 9. While the UE 115-*b* may include a single antenna, there may be examples in which the UE 115-*b* may include multiple antennas 1140.

The wireless communication manager 720-*c* may be configured to perform or control some or all of the UE or apparatus techniques or functions described with reference to FIG. 1, 2, 3, 4, 5, 6, 7, or 8 related to wireless communication over one or more RF spectrum bands. The wireless communication manager 720-*c*, or portions of it, may include a processor, or some or all of the functions of the wireless communication manager 720-*c* may be performed by the processor 1110 or in connection with the processor 1110. In some examples, the wireless communication manager 720-*c* may be an example of the wireless communication manager 720, 720-*a*, or 720-*b* described with reference to FIG. 1, 7, or 8.

Figure 12:
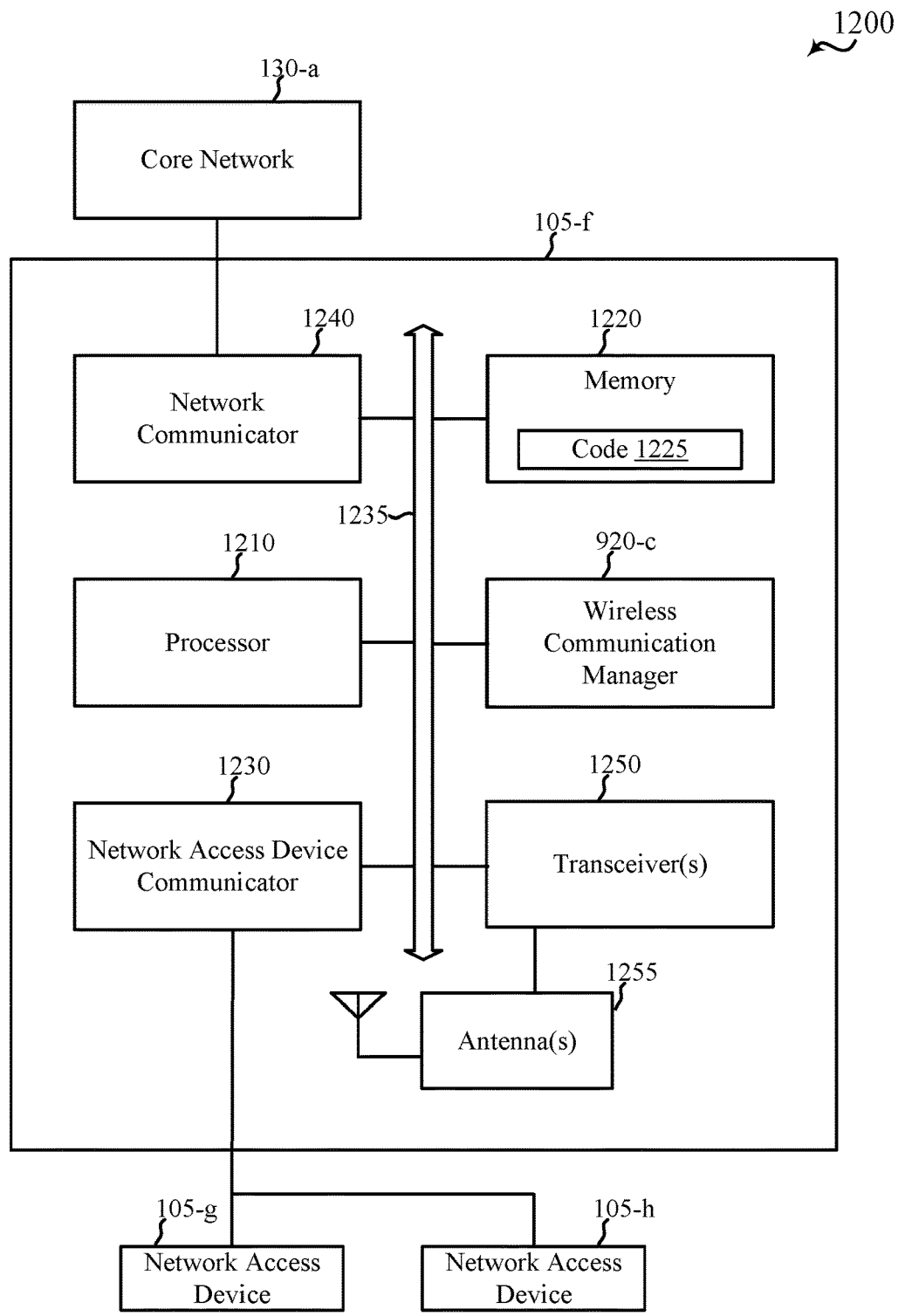
FIG. 12 shows a block diagram of a network access device for use in wireless communication, in accordance with one or more aspects of the present disclosure.

FIG. 12 shows a block diagram 1200 of a network access device 105-*f* for use in wireless communication, in accordance with one or more aspects of the present disclosure. In some examples, the network access device 105-*f* may be an example of one or more aspects of a network access device 105 (e.g., an eNB, an ANC, a RH, or a base station) described with reference to FIG. 1 or 2, or aspects of the apparatus 905 described with reference to FIG. 9. The network access device 105-*f* may be configured to implement or facilitate at least some of the network access device techniques and functions described with reference to FIG. 1, 2, 3, 4, 5, 6, 9, or 10.

The network access device 105-*f* may include a processor 1210, a memory 1220, at least one transceiver (represented by transceiver(s) 1250), at least one antenna (represented by base station antenna(s) 1255), or a wireless communication manager 920-*c*. The network access device 105-*f* may also include one or more of a network access device communicator 1230 or a network communicator 1240. Each of these components may be in communication with each other, directly or indirectly, over one or more buses 1235.

The memory 1220 may include RAM or ROM. The memory 1220 may store computer-readable, computer-executable code 1225 containing instructions that are configured to, when executed, cause the processor 1210 to perform various functions described herein related to wireless communication, including, for example, receiving from a transmitting device, during a TTI, a transmission that is shorter than a duration of the TTI, receiving, from the transmitting device, an indication of a timing of the transmission, identifying the transmission based at least in part on the indication of the timing of the transmission. Alternatively, the computer-executable code 1225 may not be directly executable by the processor 1210 but be configured to cause the network access device 105-*f* (e.g., when compiled and executed) to perform various of the functions described herein.

The processor 1210 may include an intelligent hardware device, e.g., a CPU, a microcontroller, an ASIC, etc. The processor 1210 may process information received through the transceiver(s) 1250, the network access device communicator 1230, or the network communicator 1240. The processor 1210 may also process information to be sent to the transceiver(s) 1250 for transmission through the antenna(s) 1255, to the network access device communicator 1230, for transmission to one or more other network access devices (e.g., network access device 105-*g* and network access device 105-*h*), or to the network communicator 1240 for transmission to a core network 130-*a*, which may be an example of one or more aspects of the core network 130 described with reference to FIG. 1. The processor 1210 may handle, alone or in connection with the wireless communication manager 920-*c*, various aspects of communicating over (or managing communications over) one or more RF spectrum bands.

The transceiver(s) 1250 may include a modem configured to modulate packets and provide the modulated packets to the antenna(s) 1255 for transmission, and to demodulate packets received from the antenna(s) 1255. The transceiver(s) 1250 may, in some examples, be implemented as one or more transmitters and one or more separate receivers. The transceiver(s) 1250 may support communications in one or more RF spectrum bands. The transceiver(s) 1250 may be configured to communicate bi-directionally, via the antenna(s) 1255, with one or more UEs or apparatuses, such as one or more of the UEs 115 described with reference to FIG. 1 or 11, or one or more of the apparatus 1215 described with reference to FIG. 12. The network access device 105-*f* may, for example, include multiple antennas 1255 (e.g., an antenna array). The network access device 105-*f* may communicate with the core network 130-*a* through the network communicator 1240. The network access device 105-*f* may also communicate with other network access devices, such as the network access device 105-*g* and the network access device 105-*h*, using the network access device communicator 1230.

The wireless communication manager 920-*c* may be configured to perform or control some or all of the techniques or functions described with reference to FIG. 1, 2, 3, 4, 5, 6, 9, or 10 related to wireless communication over one or more RF spectrum bands. The wireless communication manager 920-*c*, or portions of it, may include a processor, or some or all of the functions of the wireless communication manager 920-*c* may be performed by the processor 1210 or in connection with the processor 1210. In some examples, the wireless communication manager 920-*c* may be an example of the wireless communication manager 920, 920-*a*, or 920-*b* described with reference to FIG. 1, 9, or 10.

Figure 13:
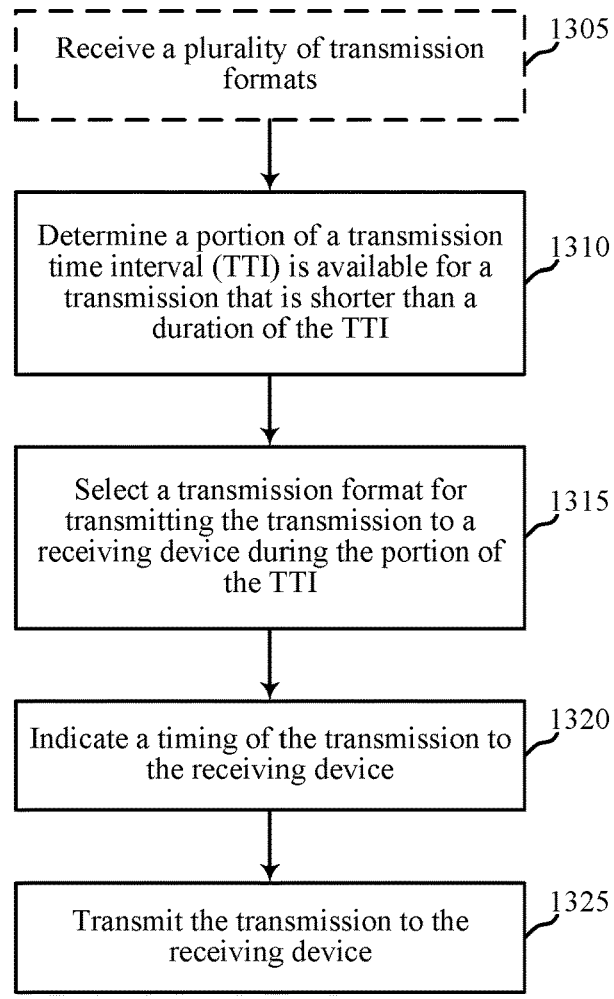
FIG. 13 is a flow chart illustrating an example of a method for wireless communication at a wireless communication device, in accordance with one or more aspects of the present disclosure.

FIG. 13 is a flow chart illustrating an example of a method 1300 for wireless communication at a wireless communication device, in accordance with one or more aspects of the present disclosure. For clarity, the method 1300 is described below with reference to aspects of a UE 115, 115-*a*, or 115-*b* described with reference to FIG. 1, 2, or 11, or aspects of the apparatus 715 described with reference to FIG. 7, or aspects of the wireless communication manager 720, 720-*a*, 720-*b*, or 720-*c* described with reference to FIG. 1, 7, 8, or 11. In some examples, a wireless communication device may execute one or more sets of codes to control the functional elements of the wireless communication device to perform the functions described below. Additionally or alternatively, the wireless communication device may perform one or more of the functions described below using special-purpose hardware.

At 1305, the method 1300 may optionally include receiving a plurality of transmission formats (e.g., from a network access device). Alternatively, a wireless communication device may be preconfigured with the plurality of transmission formats, or may receive the plurality of transmission formats in other ways. The operation(s) at 1305 may be performed using the wireless communication manager 720, 720-*a*, 720-*b*, or 720-*c* described with reference to FIG. 1, 7, 8, or 11, or the transmission format selector 740 or 740-*a* described with reference to FIG. 7 or 8.

At 1310, the method 1300 may include determining a portion of a TTI is available for a transmission that is shorter than a duration of the TTI. In some examples, the portion of the TTI may be determined based at least in part on a transmission switching event occurring during the TTI (as described with reference to FIGS. 3 and 4), or based at least in part on a timing difference between a first transmission based on a first RAT and a second transmission based on a second RAT (as described with reference to FIGS. 5 and 6). In some examples, the transmission that is shorter than the duration of the TTI may include a shortened TTI. The operation(s) at 1310 may be performed using the wireless communication manager 720, 720-*a*, 720-*b*, or 720-*c* described with reference to FIG. 1, 7, 8, or 11, the TTI availability determiner 735 or 735-*a* described with reference to FIG. 7 or 8, or the transmission switching event identifier 805 or transmission timing difference identifier 810 described with reference to FIG. 8.

At 1315, the method 1300 may include selecting a transmission format for transmitting the transmission to a receiving device during the portion of the TTI. In some examples, the transmission format may be selected from a plurality of transmission formats (e.g., from the transmission formats received at 1305). In some examples, the selected transmission format may include a shortened TTI transmission format. In some examples, the transmission format may include a puncturing of at least one symbol of the TTI, a non-transmission of at least one symbol of the TTI, or a combination thereof. In some examples, the transmission format may differ from a full-length TTI transmission format, at least one other transmission format for at least one other transmission that is shorter than the duration of the TTI, or a combination thereof. The operation(s) at 1315 may be performed using the wireless communication manager 720, 720-*a*, 720-*b*, or 720-*c* described with reference to FIG. 1, 7, 8, or 11, or the transmission format selector 740 or 740-*a* described with reference to FIG. 7 or 8.

At 1320, the method 1300 may include indicating a timing of the transmission to the receiving device. In some examples, indicating the timing of the transmission may include indicating a start time of the transmission, a stop time of the transmission, a duration of the transmission, or a combination thereof. In some examples, the timing of the transmission may be indicated by transmitting a reference signal in a first reference signal location that differs from a second reference signal location of a full-length TTI transmission, or by transmitting at least one reference signal at a first reference signal density that differs from a second reference signal density. The second reference signal density may be a reference signal density associated with a full-length TTI transmission. In some examples, the timing of the transmission may be indicated by transmitting a predetermined sequence, such as a preamble sequence, a pilot symbol configuration, or a combination thereof. The predetermined sequence may be transmitted, for example, at a start of the transmission, an end of the transmission, or a combination thereof. The operation(s) at 1320 may be performed using the wireless communication manager 720, 720-*a*, 720-*b*, or 720-*c* described with reference to FIG. 1, 7, 8, or 11, the transmission timing indicator 745 or 745-*a* described with reference to FIG. 7 or 8, or the reference signal transmitter 815 or sequence transmitter 820 described with reference to FIG. 8.

At 1325, the method 1300 may include transmitting the transmission to the receiving device. In some examples, the timing of the transmission may be indicated to the receiving device, at 1320, as part of the transmission transmitted at 1325. The operation(s) at 1325 may be performed using the wireless communication manager 720, 720-*a*, 720-*b*, or 720-*c* described with reference to FIG. 1, 7, 8, or 11, or the transmission manager 750 or 750-*a* described with reference to FIG. 7 or 8.

Figure 14:
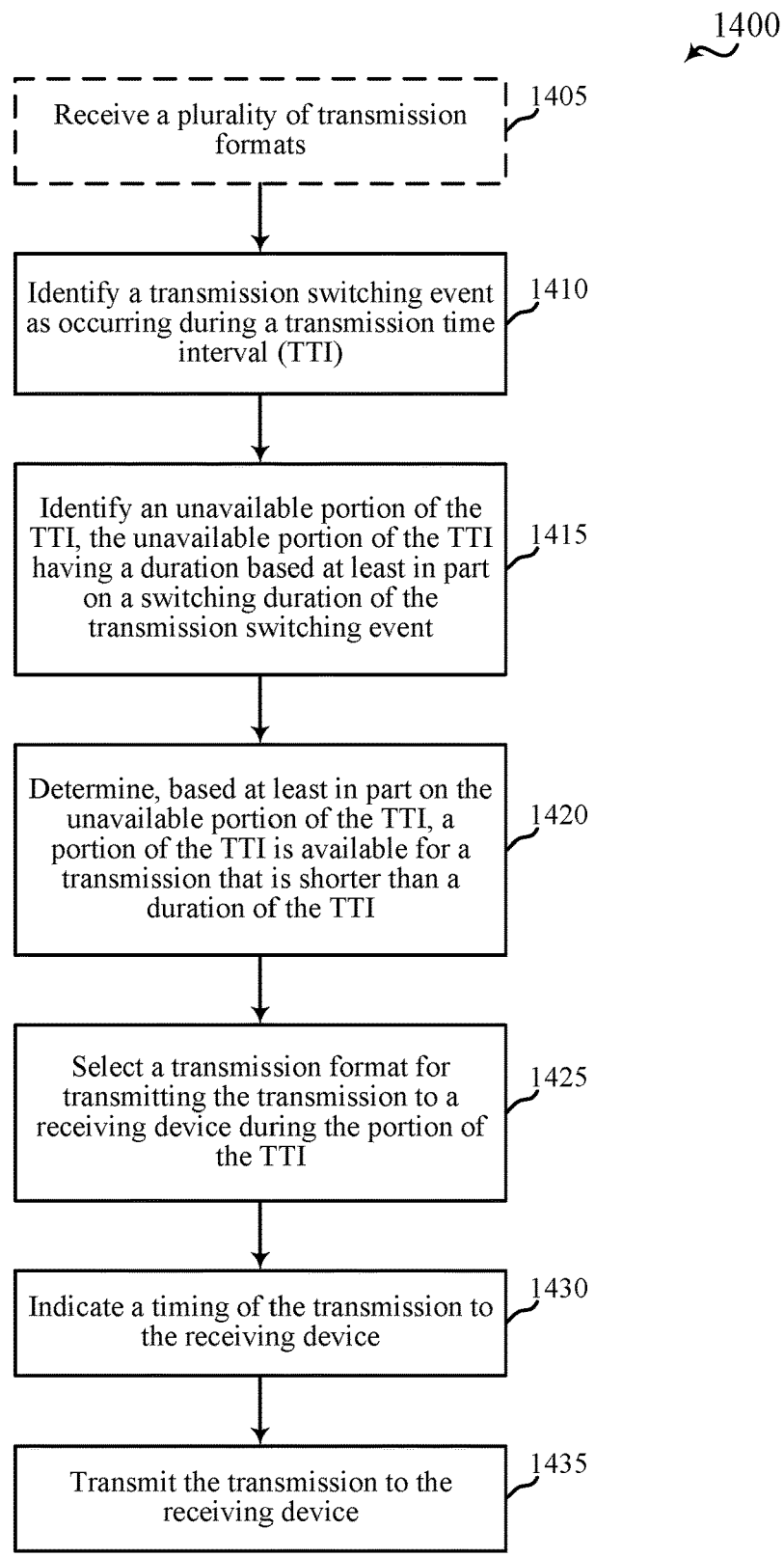
FIG. 14 is a flow chart illustrating an example of a method for wireless communication at a wireless communication device, in accordance with one or more aspects of the present disclosure.

FIG. 14 is a flow chart illustrating an example of a method 1400 for wireless communication at a wireless communication device, in accordance with one or more aspects of the present disclosure. For clarity, the method 1400 is described below with reference to aspects of a UE 115, 115-*a*, or 115-*b* described with reference to FIG. 1, 2, or 11, or aspects of the apparatus 715 described with reference to FIG. 7, or aspects of the wireless communication manager 720, 720-*a*, 720-*b*, or 720-*c* described with reference to FIG. 1, 7, 8, or 11. In some examples, a wireless communication device may execute one or more sets of codes to control the functional elements of the wireless communication device to perform the functions described below. Additionally or alternatively, the wireless communication device may perform one or more of the functions described below using special-purpose hardware.

At 1405, the method 1400 may optionally include receiving a plurality of transmission formats (e.g., from a network access device). Alternatively, a wireless communication device may be preconfigured with the plurality of transmission formats, or may receive the plurality of transmission formats in other ways. The operation(s) at 1405 may be performed using the wireless communication manager 720, 720-*a*, 720-*b*, or 720-*c* described with reference to FIG. 1, 7, 8, or 11, or the transmission format selector 740 or 740-*a* described with reference to FIG. 7 or 8.

At 1410, the method 1400 may include identifying a transmission switching event as occurring during a TTI. In some examples, the transmission switching event may include switching from a first transmission according to a first RAT to a second transmission according to a second RAT, or switching from the second transmission according to the second RAT to the first transmission according to the first RAT. The operation(s) at 1410 may be performed using the wireless communication manager 720, 720-*a*, 720-*b*, or 720-*c* described with reference to FIG. 1, 7, 8, or 11, the TTI availability determiner 735 or 735-*a* described with reference to FIG. 7 or 8, or the transmission switching event identifier 805 described with reference to FIG. 8.

At 1415, the method 1400 may include determining an unavailable portion of the TTI. The unavailable portion of the TTI may have a duration based at least in part on a switching duration of the transmission switching event. The operation(s) at 1415 may be performed using the wireless communication manager 720, 720-*a*, 720-*b*, or 720-*c* described with reference to FIG. 1, 7, 8, or 11, or the TTI availability determiner 735 or 735-*a* described with reference to FIG. 7 or 8.

At 1420, the method 1400 may include determining a portion of the TTI available for a transmission that is shorter than a duration of the TTI. In some examples, the portion of the TTI available for the transmission that is shorter than the duration of the TTI may be determined based at least in part on the unavailable portion of the TTI identified at 1415. In some examples, the transmission that is shorter than the duration of the TTI may include a shortened TTI. The operation(s) at 1420 may be performed using the wireless communication manager 720, 720-*a*, 720-*b*, or 720-*c* described with reference to FIG. 1, 7, 8, or 11, or the TTI availability determiner 735 or 735-*a* described with reference to FIG. 7 or 8.

At 1425, the method 1400 may include selecting a transmission format for transmitting the transmission to a receiving device during the portion of the TTI. In some examples, the transmission format may be selected from a plurality of transmission formats (e.g., from the transmission formats received at 1405). In some examples, the selected transmission format may include a shortened TTI transmission format. In some examples, the transmission format may include a puncturing of at least one symbol of the TTI, a non-transmission of at least one symbol of the TTI, or a combination thereof. In some examples, the transmission format may differ from a full-length TTI transmission format, at least one other transmission format for at least one other transmission that is shorter than the duration of the TTI, or a combination thereof. The operation(s) at 1425 may be performed using the wireless communication manager 720, 720-*a*, 720-*b*, or 720-*c* described with reference to FIG. 1, 7, 8, or 11, or the transmission format selector 740 or 740-*a* described with reference to FIG. 7 or 8.

At 1430, the method 1400 may include indicating a timing of the transmission to the receiving device. In some examples, indicating the timing of the transmission may include indicating a start time of the transmission, a stop time of the transmission, a duration of the transmission, or a combination thereof. In some examples, the timing of the transmission may be indicated by transmitting a reference signal in a first reference signal location that differs from a second reference signal location of a full-length TTI transmission, or by transmitting at least one reference signal at a first reference signal density that differs from a second reference signal density. The second reference signal density may be a reference signal density associated with a full-length TTI transmission. In some examples, the timing of the transmission may be indicated by transmitting a predetermined sequence, such as a preamble sequence, a pilot symbol configuration, or a combination thereof. The predetermined sequence may be transmitted, for example, at a start of the transmission, an end of the transmission, or a combination thereof. The operation(s) at 1430 may be performed using the wireless communication manager 720, 720-*a*, 720-*b*, or 720-*c* described with reference to FIG. 1, 7, 8, or 11, the transmission timing indicator 745 or 745-*a* described with reference to FIG. 7 or 8, or the reference signal transmitter 815 or sequence transmitter 820 described with reference to FIG. 8.

At 1435, the method 1400 may include transmitting the transmission to the receiving device. In some examples, the timing of the transmission may be indicated to the receiving device, at 1430, as part of the transmission transmitted at 1435. The operation(s) at 1435 may be performed using the wireless communication manager 720, 720-*a*, 720-*b*, or 720-*c* described with reference to FIG. 1, 7, 8, or 11, or the transmission manager 750 or 750-*a* described with reference to FIG. 7 or 8.

In some examples, aspects of the methods 1300 and 1400 described with reference to FIGS. 13 and 14 may be combined.

Figure 15:
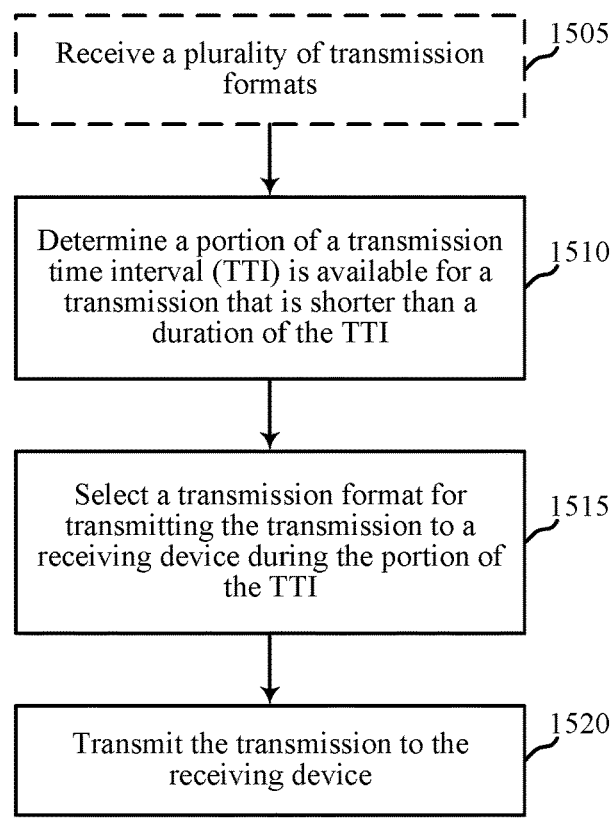
FIG. 15 is a flow chart illustrating an example of a method for wireless communication at a wireless communication device, in accordance with one or more aspects of the present disclosure.

FIG. 15 is a flow chart illustrating an example of a method 1500 for wireless communication at a wireless communication device, in accordance with one or more aspects of the present disclosure. For clarity, the method 1500 is described below with reference to aspects of a UE 115, 115-*a*, or 115-*b* described with reference to FIG. 1, 2, or 11, or aspects of the apparatus 715 described with reference to FIG. 7, or aspects of the wireless communication manager 720, 720-*a*, 720-*b*, or 720-*c* described with reference to FIG. 1, 7, 8, or 11. In some examples, a wireless communication device may execute one or more sets of codes to control the functional elements of the wireless communication device to perform the functions described below. Additionally or alternatively, the wireless communication device may perform one or more of the functions described below using special-purpose hardware.

At 1505, the method 1500 may optionally include receiving a plurality of transmission formats (e.g., from a network access device). Alternatively, a wireless communication device may be preconfigured with the plurality of transmission formats, or may receive the plurality of transmission formats in other ways. The operation(s) at 1505 may be performed using the wireless communication manager 720, 720-*a*, 720-*b*, or 720-*c* described with reference to FIG. 1, 7, 8, or 11, or the transmission format selector 740 or 740-*a* described with reference to FIG. 7 or 8.

At 1510, the method 1500 may include determining a portion of a TTI is available for a transmission that is shorter than a duration of the TTI. In some examples, the portion of the TTI may be determined based at least in part on a transmission switching event occurring during the TTI (as described with reference to FIGS. 3 and 4), or based at least in part on a timing difference between a first transmission based on a first RAT and a second transmission based on a second RAT (as described with reference to FIGS. 5 and 6). In some examples, the transmission that is shorter than the duration of the TTI may include a shortened TTI. The operation(s) at 1510 may be performed using the wireless communication manager 720, 720-*a*, 720-*b*, or 720-*c* described with reference to FIG. 1, 7, 8, or 11, the TTI availability determiner 735 or 735-*a* described with reference to FIG. 7 or 8, or the transmission switching event identifier 805 or transmission timing difference identifier 810 described with reference to FIG. 8.

At 1515, the method 1500 may include selecting a transmission format for transmitting the transmission to a receiving device during the portion of the TTI. In some examples, the transmission format may be selected from a plurality of transmission formats (e.g., from the transmission formats received at 1505). In some examples, the selected transmission format may include a shortened TTI transmission format. In some examples, the transmission format may include a puncturing of at least one symbol of the TTI, a non-transmission of at least one symbol of the TTI, or a combination thereof. In some examples, the transmission format may differ from a full-length TTI transmission format, at least one other transmission format for at least one other transmission that is shorter than the duration of the TTI, or a combination thereof. The operation(s) at 1515 may be performed using the wireless communication manager 720, 720-*a*, 720-*b*, or 720-*c* described with reference to FIG. 1, 7, 8, or 11, or the transmission format selector 740 or 740-*a* described with reference to FIG. 7 or 8.

At 1520, the method 1500 may include transmitting the transmission to the receiving device. The operation(s) at 1520 may be performed using the wireless communication manager 720, 720-*a*, 720-*b*, or 720-*c* described with reference to FIG. 1, 7, 8, or 11, or the transmission manager 750 or 750-*a* described with reference to FIG. 7 or 8.

Figure 16:
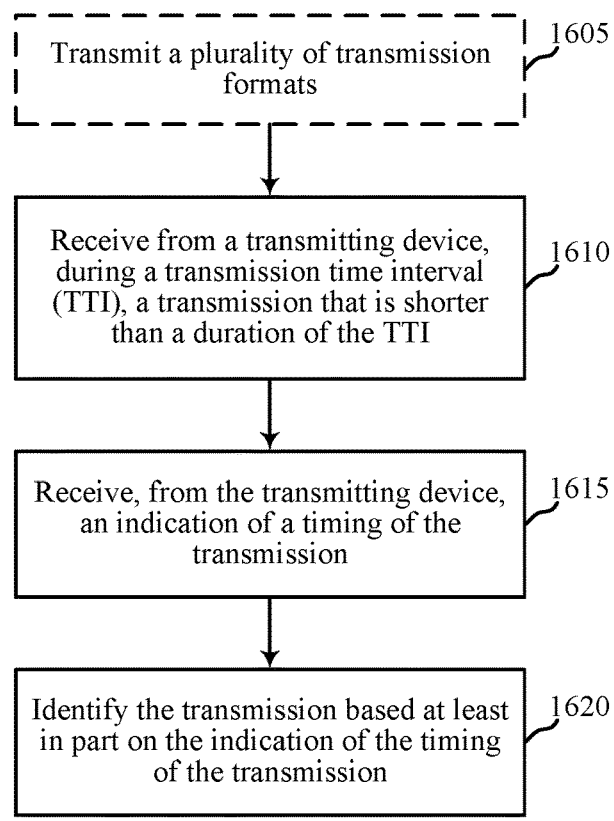
FIG. 16 is a flow chart illustrating an example of a method for wireless communication at a wireless communication device, in accordance with one or more aspects of the present disclosure.

FIG. 16 is a flow chart illustrating an example of a method 1600 for wireless communication at a wireless communication device, in accordance with one or more aspects of the present disclosure. For clarity, the method 1600 is described below with reference to aspects of a network access device 105 (e.g., an eNB, an ANC, a RH, or a base station) described with reference to FIG. 1, 2, or 12, or aspects of the wireless communication manager 920, 920-*a*, 920-*b*, or 920-*c* described with reference to FIG. 1, 9, 10, or 12. In some examples, a wireless communication device may execute one or more sets of codes to control the functional elements of the wireless communication device to perform the functions described below. Additionally or alternatively, the wireless communication device may perform one or more of the functions described below using special-purpose hardware.

At 1605, the method 1600 may optionally include transmitting a plurality of transmission formats (e.g., to one or more UEs). In some examples, the transmission formats may include one or more transmissions formats that differ from one or more full-length TTI transmission formats, one or more transmission formats for transmissions shorter than a duration of a full-length TTI, or a combination thereof. In some examples, one or more of the transmission formats may include a puncturing of at least one symbol of a full-length TTI, a non-transmission of at least one symbol of a full-length TTI, or a combination thereof. In some examples, the transmission formats may include shortened TTI transmission formats. The operation(s) at 1605 may be performed using the wireless communication manager 920, 920-*a*, 920-*b*, or 920-*c* described with reference to FIG. 1, 9, 10, or 12, or the transmission format manager 1005 described with reference to FIG. 10.

At 1610, the method 1600 may include receiving from a transmitting device, during a TTI, a transmission that is shorter than a duration of the TTI. In some examples, the transmission that is shorter than the duration of the TTI may include a shortened TTI. The operation(s) at 1610 may be performed using the wireless communication manager 920, 920-*a*, 920-*b*, or 920-*c* described with reference to FIG. 1, 9, 10, or 12, or the transmission reception manager 935 or 935-*a* described with reference to FIG. 9 or 10.

At 1615, the method 1600 may include receiving, from the transmitting device, an indication of a timing of the transmission received at 1610. In some examples, the indication of the timing of the transmission may indicate a start time of the transmission, a stop time of the transmission, a duration of the transmission, or a combination thereof. In some examples, the indication of the timing of the transmission may include a reference signal received in a first reference signal location that differs from a second reference signal location of a full-length TTI transmission, or at least one reference signal received at a first reference signal density that differs from a second reference signal density. The second reference signal density may be a reference signal density associated with a full-length TTI transmission. In some examples, the indication of the timing of the transmission may include a predetermined sequence, such as a preamble sequence, a pilot symbol configuration, or a combination thereof. The predetermined sequence may be received, for example, at a start of the transmission, an end of the transmission, or a combination thereof. In some examples, the indication of the timing of the transmission may be received as part of the transmission received at 1610. The operation(s) at 1615 may be performed using the wireless communication manager 920, 920-*a*, 920-*b*, or 920-*c* described with reference to FIG. 1, 9, 10, or 12, the transmission timing indicator processor 940 or 940-*a* described with reference to FIG. 9 or 10, or the reference signal processor 1010 or sequence identifier 1015 described with reference to FIG. 10.

At 1620, the method 1600 may include identifying the transmission based at least in part on the indication of the timing of the transmission. The operation(s) at 1620 may be performed using the wireless communication manager 920, 920-*a*, 920-*b*, or 920-*c* described with reference to FIG. 1, 9, 10, or 12, or the transmission reception manager 935 or 935-*a* described with reference to FIG. 9 or 10.

The methods 1300, 1400, 1500, and 1600 described with reference to FIGS. 13, 14, 15, and 16 may provide for wireless communication. It should be noted that the methods 1300, 1400, 1500, and 1600 are just example implementations, and the operations of the methods 1300, 1400, 1500, and 1600 may be rearranged or otherwise modified such that other implementations are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method of wireless communication at a wireless communication device, comprising:
    determining a portion of a transmission time interval (TTI) that is shorter than a duration of the TTI;
    selecting a transmission format from a plurality of transmission formats for transmitting a transmission to a receiving device during the portion of the TTI, wherein the transmission format comprises a reference signal location and a start of the portion of the TTI, the plurality of transmission formats being different; and
    indicating a timing of the transmission to the receiving device, wherein the portion of the TTI is determined based at least in part on a transmission switching event occurring during the TTI; and
    identifying the transmission switching event as occurring during the TTI; and
    identifying an unavailable portion of the TTI, the unavailable portion of the TTI having a second duration based at least in part on a switching duration of the transmission switching event,
    wherein the portion of the TTI available for the transmission is determined based at least in part on the unavailable portion of the TTI.

2. The method of claim 1, wherein indicating the timing of the transmission to the receiving device comprises:
    a reference signal in a first reference signal location that differs from a second reference signal location of a full-length TTI transmission.

3. The method of claim 1, wherein indicating the timing of the transmission to the receiving device comprises:
    at least one reference signal at a first reference signal density that differs from a second reference signal density associated with a full-length TTI transmission.

4. The method of claim 1, wherein indicating the timing of the transmission comprises:
    transmitting a predetermined sequence.

5. The method of claim 4, wherein the predetermined sequence is transmitted at:
    a start of the transmission, or an end of the transmission, or a combination thereof.

6. The method of claim 4, wherein the predetermined sequence comprises:
    a preamble sequence, or a pilot symbol configuration, or a combination thereof.

7. The method of claim 1, wherein indicating the timing of the transmission comprises indicating:
    a start time of the transmission, or a stop time of the transmission, or a duration of the transmission, or a combination thereof.

8. The method of claim 1, wherein the timing of the transmission is indicated to the receiving device as part of the transmission.

9. The method of claim 1, wherein the transmission format comprises a shortened TTI transmission format, and the transmission comprises a shortened TTI.

10. The method of claim 1, wherein the transmission format comprises:
a puncturing of at least one symbol of the TTI, or a non-transmission of at least one symbol of the TTI, or a combination thereof.

11. The method of claim 1, wherein the transmission format differs from:
a full-length TTI transmission format, or at least one other transmission format for at least one other transmission that is shorter than the duration of the TTI, or a combination thereof.

12. The method of claim 1, further comprising:
receiving the plurality of transmission formats from a network access device.

13. The method of claim 1, wherein the transmission switching event comprises:
switching from a first transmission according to a first radio access technology (RAT) to a second transmission according to a second RAT, or switching from the second transmission according to the second RAT to the first transmission according to the first RAT.

14. The method of claim 13, further comprising:
restricting the wireless communication device from transmitting based at least in part on a timing difference between the first transmission based at least in part on the first RAT and the second transmission based at least in part on the second RAT.

15. The method of claim 1, wherein the portion of the TTI available is determined based at least in part on a timing difference between a first transmission based at least in part on a first radio access technology (RAT) and a second transmission based at least in part on a second RAT.

16. The method of claim 1, further comprising:
transmitting the transmission to the receiving device.

17. The method of claim 16, wherein the transmission format comprises a shortened TTI transmission format, and the transmission comprises a shortened TTI.

18. The method of claim 1, a reference signal of the reference signal location comprising a demodulation reference signal.

19. An apparatus for wireless communication, comprising:
a memory;
a processor coupled to the memory, the processor being configured to:
determine a portion of a transmission time interval (TTI) that is shorter than a duration of the TTI;
select, based at least in part on the portion of the TTI, a transmission format from a plurality of transmission formats for transmitting a transmission to a receiving device during the portion of the TTI, wherein the transmission format comprises a reference signal location and a start of the portion of the TTI, the plurality of transmission formats being different; and
indicate a timing of the transmission to the receiving device, wherein the portion of the TTI is determined based at least in part on a transmission switching event occurring during the TTI; and
identify the transmission switching event as occurring during the TTI; and
identify an unavailable portion of the TTI, the unavailable portion of the TTI having a second duration based at least in part on a switching duration of the transmission switching event, wherein the portion of the TTI available for the transmission is determined based at least in part on the unavailable portion of the TTI.

20. The apparatus of claim 19, wherein the transmission format comprises a shortened TTI transmission format, and the transmission comprises a shortened TTI.

21. A method of wireless communication at a wireless communication device, comprising:
determining a portion of a transmission time interval (TTI) that is shorter than a duration of the TTI;
selecting a transmission format from a plurality of transmission formats for transmitting a transmission to a receiving device during the portion of the TTI, wherein the transmission format comprises a reference signal location and a start of the portion of the TTI, the plurality of transmission formats being different; and
indicating a timing of the transmission to the receiving device, wherein the portion of the TTI is determined based at least in part on a transmission switching event occurring during the TTI,
wherein the transmission switching event comprises:
switching from a first transmission according to a first radio access technology (RAT) to a second transmission according to a second RAT, or switching from the second transmission according to the second RAT to the first transmission according to the first RAT; and
further comprising:
restricting the wireless communication device from transmitting based at least in part on a timing difference between the first transmission based at least in part on the first RAT and the second transmission based at least in part on the second RAT.

22. A method of wireless communication at a wireless communication device, comprising:
determining a portion of a transmission time interval (TTI) that is shorter than a duration of the TTI;
selecting a transmission format from a plurality of transmission formats for transmitting a transmission to a receiving device during the portion of the TTI, wherein the transmission format comprises a reference signal location and a start of the portion of the TTI, the plurality of transmission formats being different; and
indicating a timing of the transmission to the receiving device, wherein the portion of the TTI available is determined based at least in part on a timing difference between a first transmission based at least in part on a first radio access technology (RAT) and a second transmission based at least in part on a second RAT.

23. An apparatus for wireless communication, comprising:
a memory;
a processor coupled to the memory, the processor being configured to:
determine a portion of a transmission time interval (TTI) that is shorter than a duration of the TTI;
select, based at least in part on the portion of the TTI, a transmission format from a plurality of transmission formats for transmitting a transmission to a receiving device during the portion of the TTI, wherein the transmission format comprises a reference signal location and a start of the portion of the TTI, the plurality of transmission formats being different; and indicate a timing of the transmission to the receiving device, wherein the portion of the TTI is determined based at least in part on a transmission switching event occurring during the TTI;

wherein the transmission switching event comprises:

switching from a first transmission according to a first radio access technology (RAT) to a second transmission according to a second RAT, or switching from the second transmission according to the second RAT to the first transmission according to the first RAT; and the processor being further configured to:

restrict the wireless communication device from transmitting based at least in part on a timing difference between the first transmission based at least in part on the first RAT and the second transmission based at least in part on the second RAT.

24. An apparatus for wireless communication, comprising:

a memory;

a processor coupled to the memory, the processor being configured to:

determine a portion of a transmission time interval (TTI) that is shorter than a duration of the TTI;

select, based at least in part on the portion of the TTI, a transmission format from a plurality of transmission formats for transmitting a transmission to a receiving device during the portion of the TTI, wherein the transmission format comprises a reference signal location and a start of the portion of the TTI, the plurality of transmission formats being different;

indicate a timing of the transmission to the receiving device; and indicate a timing of the transmission to the receiving device, wherein the portion of the TTI available is determined based at least in part on a timing difference between a first transmission based at least in part on a first radio access technology (RAT) and a second transmission based at least in part on a second RAT.

* * * * *